US009881226B1

(12) United States Patent
Rybakov et al.

(10) Patent No.: US 9,881,226 B1
(45) Date of Patent: Jan. 30, 2018

(54) OBJECT RELATION BUILDER

(71) Applicant: Amazon Technologies, Inc., Reno, NV (US)

(72) Inventors: Oleg Rybakov, Seattle, WA (US); Matias Omar Gregorio Benitez, Seattle, WA (US); Leo Parker Dirac, Seattle, WA (US); Rejith George Joseph, Seattle, WA (US); Vijai Mohan, Seattle, WA (US); Srikanth Thirumalai, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 80 days.

(21) Appl. No.: 14/864,605

(22) Filed: Sep. 24, 2015

(51) Int. Cl.
*G06K 9/46* (2006.01)
*G06T 7/00* (2017.01)
*G06T 1/00* (2006.01)
*G06K 9/00* (2006.01)

(52) U.S. Cl.
CPC ........... *G06K 9/46* (2013.01); *G06K 9/00201* (2013.01); *G06T 1/0007* (2013.01); *G06T 7/0081* (2013.01); *G06T 2207/10004* (2013.01)

(58) Field of Classification Search
CPC ...... G06K 9/46; G06K 9/00201; G06K 9/469; G06T 1/0007; G06T 7/0081; G06T 2207/10004
See application file for complete search history.

(56) References Cited

U.S. PATENT DOCUMENTS 5,640,468 A * 6/1997 Hsu .................... G06K 9/00201
382/190
2014/0149376 A1 * 5/2014 Kutaragi .............. G06K 9/4676
707/706

* cited by examiner

*Primary Examiner* — Jon Chang
(74) *Attorney, Agent, or Firm* — Hogan Lovells US LLP

(57) ABSTRACT

Recommendations can be generated even in situations where sufficient user information is unavailable for providing personalized recommendations. Instead of generating recommendations for an item based on item type or category, a relation graph can be consulted that enables other items to be recommended that are related to the item in some way, which may be independent of the type or category of item. For example, images of models, celebrities, or everyday people wearing items of clothing, jewelry, handbags, shoes, and other such items can be received and analyzed to recognize those items and cause them to be linked in the relation graph. When generating recommendations or selecting advertisements, the relation graph can be consulted to recommend products that other people have obtained with the item from any of a number of sources, such that the recommendations may be more valuable to the user.

19 Claims, 15 Drawing Sheets

OBJECT RELATION BUILDER

BACKGROUND

Users are increasingly utilizing computing devices to access various types of content. Oftentimes the content is provided at little or no cost to the user, with a provider of the content obtaining monetization through the display of one or more advertisements or recommendations along with the content. If the user is viewing content for a specific product, for example, the provider might cause content for one or more other products to be recommended to the user, where the recommendations are generated using information such as products that were viewed and/or purchased previously by the user. For new users, or users who have not yet logged in or been identified to the content provider system, there will be no such information available on which to base recommendations. The recommendations will solely be based on information such as items in the same category or similar items, which will not provide the optimal experience for the user or the provider, and will result in the use of resources to display content that may not be of interest to the user.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to determining content to be provided for a user in an electronic environment. In particular, various embodiments analyze images from various sources to attempt to recognize items that may be able to be associated in some way, such as clothing that may be worn together, items that may be arranged together as part of a display, or other such relations that may not otherwise be discernible from descriptive information available in an electronic catalog. In some cases, the images can include celebrities, models, designers, or other persons wearing items or otherwise exhibiting items that can be associated together. A person wearing a particular designer scarf might wear other designer goods that are determined to match the particular scarf, but that person might also tend to purchase a particular type of tablet computer, wear a certain style of shoe, read certain types of magazines, buy certain types of furniture, etc., and these associations might not otherwise be able to be made but through the analysis of one or more images showing people having these items together. Various approaches for segmenting images, determining visually similar items, and performing image recognition and matching can be utilized, which can help to build a relation graph for various items and then help to recommend items using the relation graph in response to a query or other such occurrence.

Various other functions and advantages are described and suggested below as may be provided in accordance with the various embodiments.

Figure 1A:
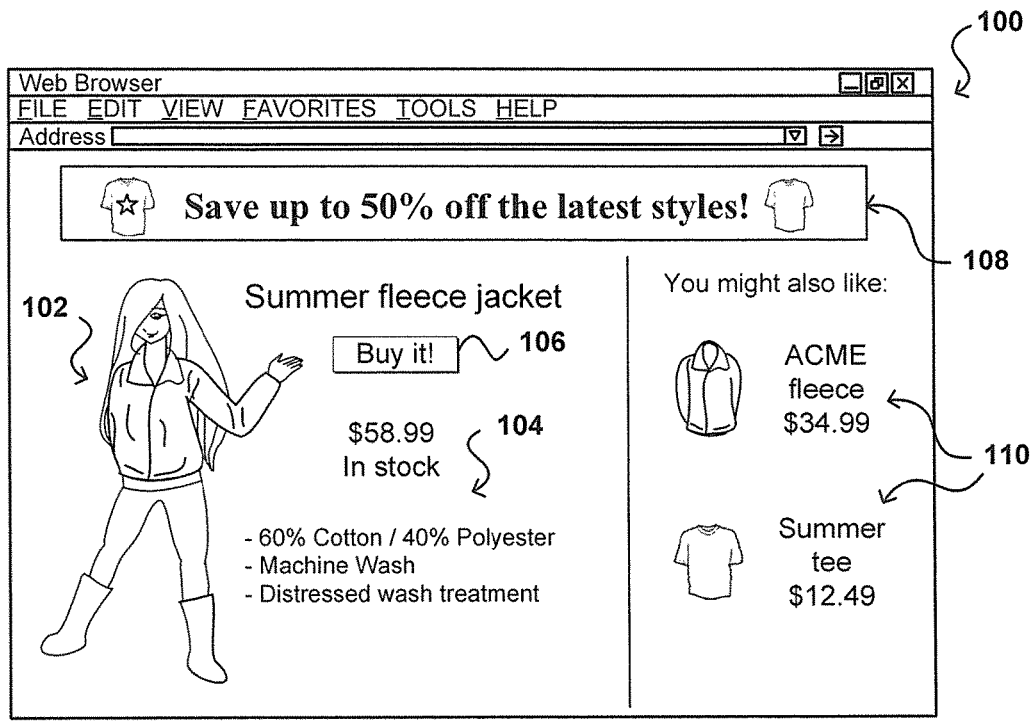
FIGS. 1A and 1B illustrate example displays of content including recommendations that can be provided in accordance with various embodiments.
Figure 1B:
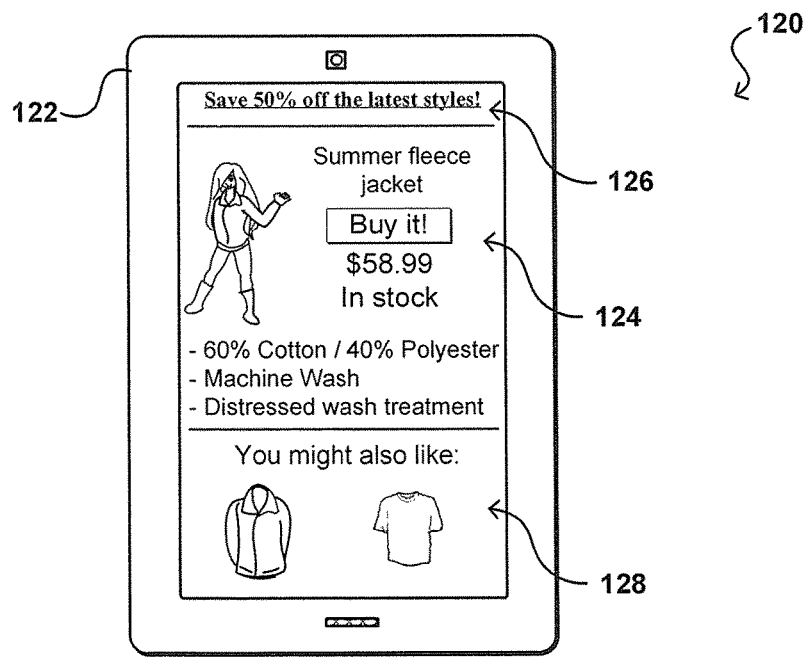

FIG. 1A illustrates an example display 100 of content that can be presented in accordance with various embodiments. In this example, a user of an electronic marketplace (or other such source of electronic content) has requested a page of content corresponding to a jacket of interest to the user. The content can include, for example, an image 102 of the jacket, a description 104 of the jacket, an option 106 to purchase the jacket, and other such information or content. The page could have been accessed through a variety of different approaches, such as may be a result of a received search query, browse, or navigation request, among other such options. While a page of content relating to an item available for consumption (i.e., purchase, rent, lease, download, or otherwise obtain) is presented for purposes of explanation, it should be understood that other types of content, such as search results, electronic book content, multimedia content, and the like, can be presented to a user via a computing device as well within the scope of the various embodiments. As illustrated, the display 100 also includes an advertisement 108 displayed with the content. The advertisement might be provided with the content, or the code (e.g., HTML, XML, CSS, etc.) for displaying the content might include code causing one or more advertisements to be obtained from a third party and displayed with the content, according to any restrictions set by the content provider. The advertising might be selected based upon various factors, such as may include information about the object 102 of interest, or information for similar objects that may be of interest to the user. Similarly, the display 100 includes a set of recommendations 110 that include content for related objects that may be of interest to the user. The recommendations can be determined using various criteria that can be the same as, or at least partially different from, those used to select the advertising 108. In this example, the objects 110 recommended are from the same category as the object of interest 102, such as a clothing category. While a Web browser interface is shown as an example in FIG. 1A, it should be understood that other types of interfaces or displays of content can be presented as well, such as the interface 120 displayed as part of a mobile app displayed on a portable computing device 122 as illustrated in FIG. 1B. This display similarly includes primary content 124 relating to an object of interest, as well as advertising content 126 and one or more recommendations 128. The content can be served, or otherwise received from, the same or different providers over the same or different networks.

In determining which advertisements and/or recommendations to provide, it can be desirable in at least some embodiments to determine content that is likely to be viewed and/or objects that are likely to be consumed by a user based at least in part upon information known for the user. In many embodiments there will be information about items or content that the user has viewed, searched, or consumed, among other such options. This can be combined with various other types of information in order to generate not only recommendations that are related to the content being viewed, but are also relevant to the user based upon what is known about the particular user. There are many algorithms and approaches used for processing such content to determine recommendations or suggestions to be displayed to a user.

It might be the case, however, that information about the user is not available for use in generating such recommendations. For example, the user might be visiting the site for the first time, or might not have created an account, accepted a cookie, or performed/allowed another such action that could have enabled tracking information for a user. In some cases, the user might have an account but has not yet logged in to enable that account information to be correlated with that user for the current session, or the user might be using a device which does not include a tracking cookie or other such information. A user alternatively may have an account and allowed a tracking cookie or other such mechanism, but has so little data stored that the data has little impact on the recommendations. Various other scenarios exist whereby past user behavior, performance, or other such data is not available for the user on a current session. In such situations, recommendations generated for the user would be based on information that is not specific to the user, as may relate to the item being viewed, data for the item category, information for other users having purchased or viewed the item, etc. These recommendations may have some value but will not take into account information for the specific user, which will prevent the recommendations from being as useful and relevant to the user as would otherwise be possible. This can negatively impact the user experience, reduce the likelihood of a conversion for the content provider or an advertiser, and can result in the user viewing additional pages or performing additional navigational steps to locate content of interest, which can result in extra consumption of resources such as bandwidth, memory, processing capacity, and the like.

Accordingly, approaches in accordance with various embodiments attempt to obtain information that can help to produce more useful recommendations to be displayed in a situation where no, or little, information is available for a user to which the content is being displayed. In various embodiments, data available that relates to an item in a product catalog, for example, can be analyzed and aggregated in order to attempt to locate other items that are related and relevant to the item. This can include, for example, analyzing images, articles, and other sources of electronic content to attempt to locate items that might be relevant to the item of interest. In a clothing example, this can include items that might be worn with the item of interest, match the item of interest, be frequently utilized or exhibited with the item of interest, etc. For example, a set, stream, or other collection of image data (i.e., still images or video) can be analyzed to determine which images, or image frames, include the item of interest. Each such image can also be analyzed to attempt to determine other items in that image that are contained within the electronic catalog, or are at least identifiable in some embodiments. These can include, for example, shoes, a belt, sunglasses, pants, skirts, or other apparel items that are located in an image that includes a shirt of interest. The analysis can also ensure that the apparel items are associated with the person wearing the shirt. This can help to identify items that may be worn with the item of interest, such that they might also be of interest to a user who is viewing content about the item of interest.

It should be noted that not everyone's taste is the same, and that there can be many different items worn or used together that may not appeal to a majority of users. Since the information is being aggregated across multiple sources and instances, the items that most frequently appear together can be weighted or ranked more highly (or associated more strongly with each other) than items that are rarely worn together. Further, certain sources might be weighted more highly than others. For example, items represented together in an image from a fashion magazine might be weighted more highly than items worn together in an uploaded user image or photo from a social networking site. Further, items worn together by a celebrity, professional athlete, musician, or other high profile person might be weighted higher for at least certain types of items, such as designer goods or jewelry. The response to recommendations presented to users can also be monitored over time, such that if no users select a recommendation for a particular item then that item can be weighted less or lowered in the rankings so that the recommendation shows less frequently, if at all.

Figure 2A:
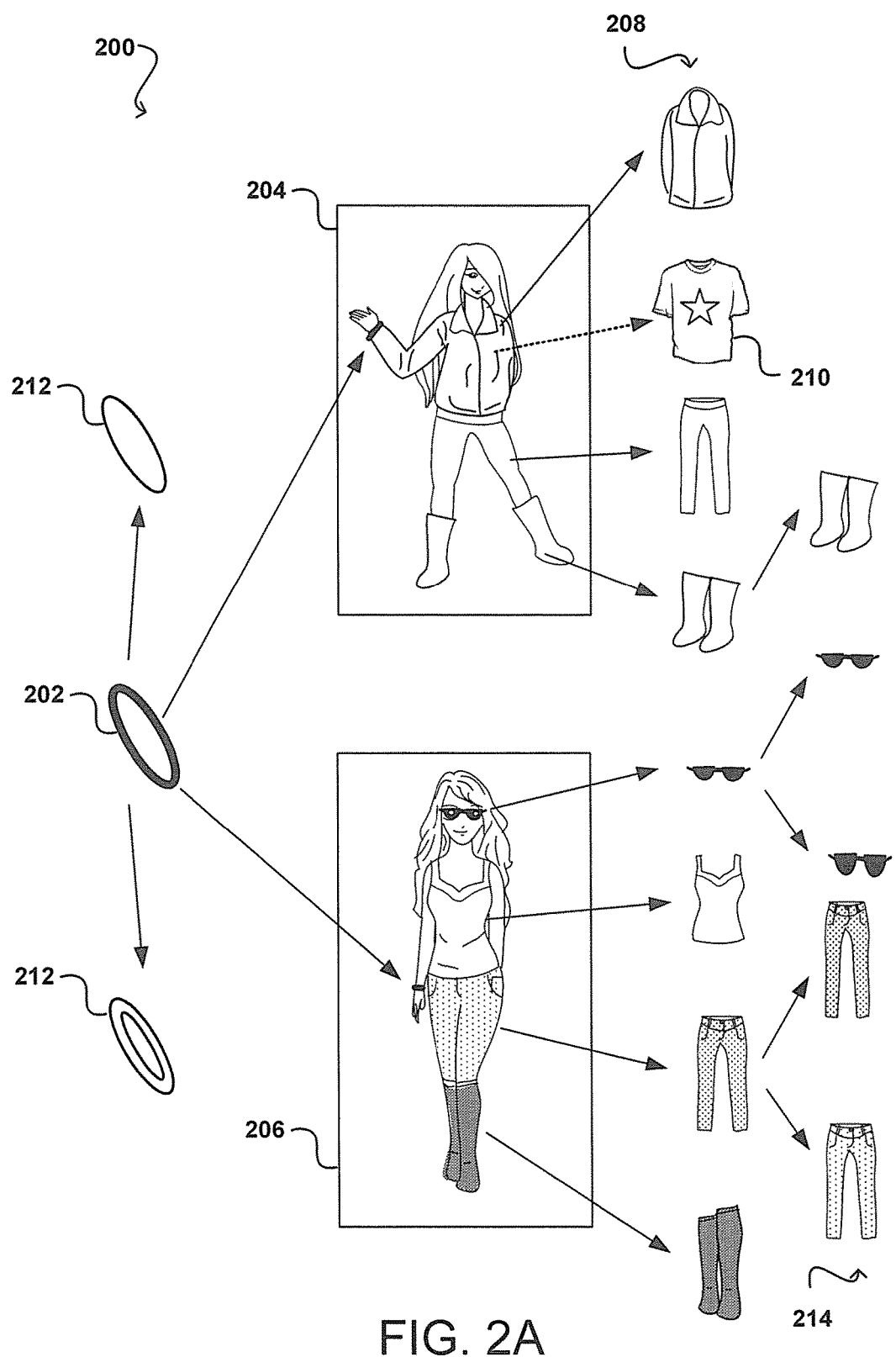
FIGS. 2A, 2B, and 2C illustrates an example process for generating a relation graph that can be used to determine recommendations in accordance with various embodiments.
Figure 2B:
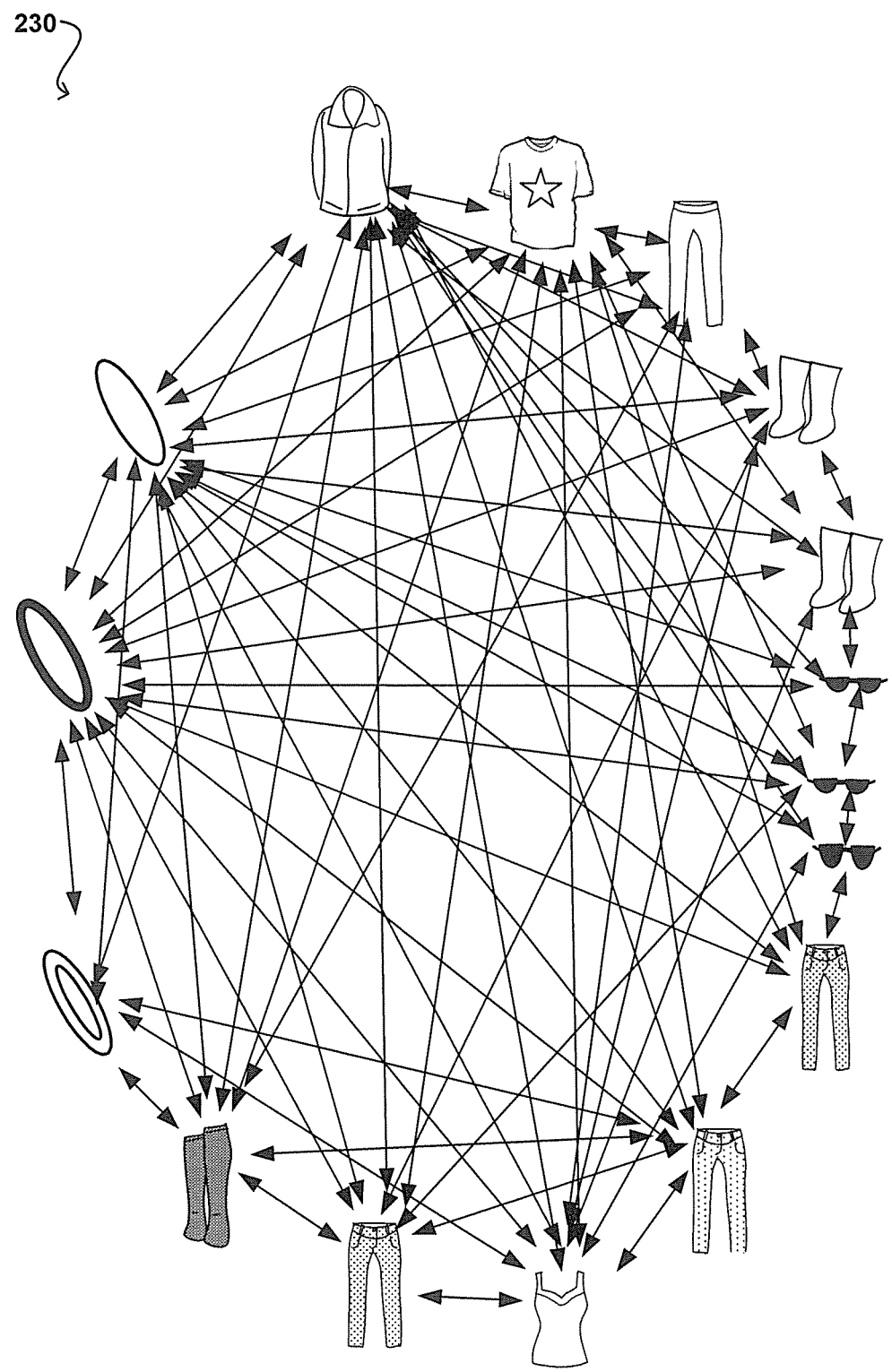

FIGS. 2A and 2B illustrate an example approach to generating a relation graph that can be utilized to determine recommendations for display in accordance with various embodiments. The example situation 200 in FIG. 2A illustrates two images 204, 206 that each include a person wearing an item of interest 202, in this case a specific bracelet. Along with the bracelet, the person in each image is wearing a number of other identifiable items 208, as may include shirts, pants, boots, sunglasses, and the like. In some cases the item may be identified by analyzing the image data, while in other embodiments data or metadata associated with the image might provide information about the items, such as may enable an item 210 that may not be visible in the image, at least to an extent recognizable by an object recognition algorithm, but is being worn by the model. As mentioned later herein, visually similar items can also be identified for inclusion in the relation graph. As illustrated, there can be various items 212 that are determined to be visually similar to the item of interest 212, as well as visually similar items 214 for items 208 identified from the images. Based at least in part upon the correlation of the items in the images and the visually similar items, a relation graph 230 can begin to be generated that includes links between all these items as being at least somewhat related. As mentioned later herein, each link can have a relationship score, relevance score, strength score, or other such value that can help determine which items should be selected as recommendations for a determined item of interest.

Figure 2C:
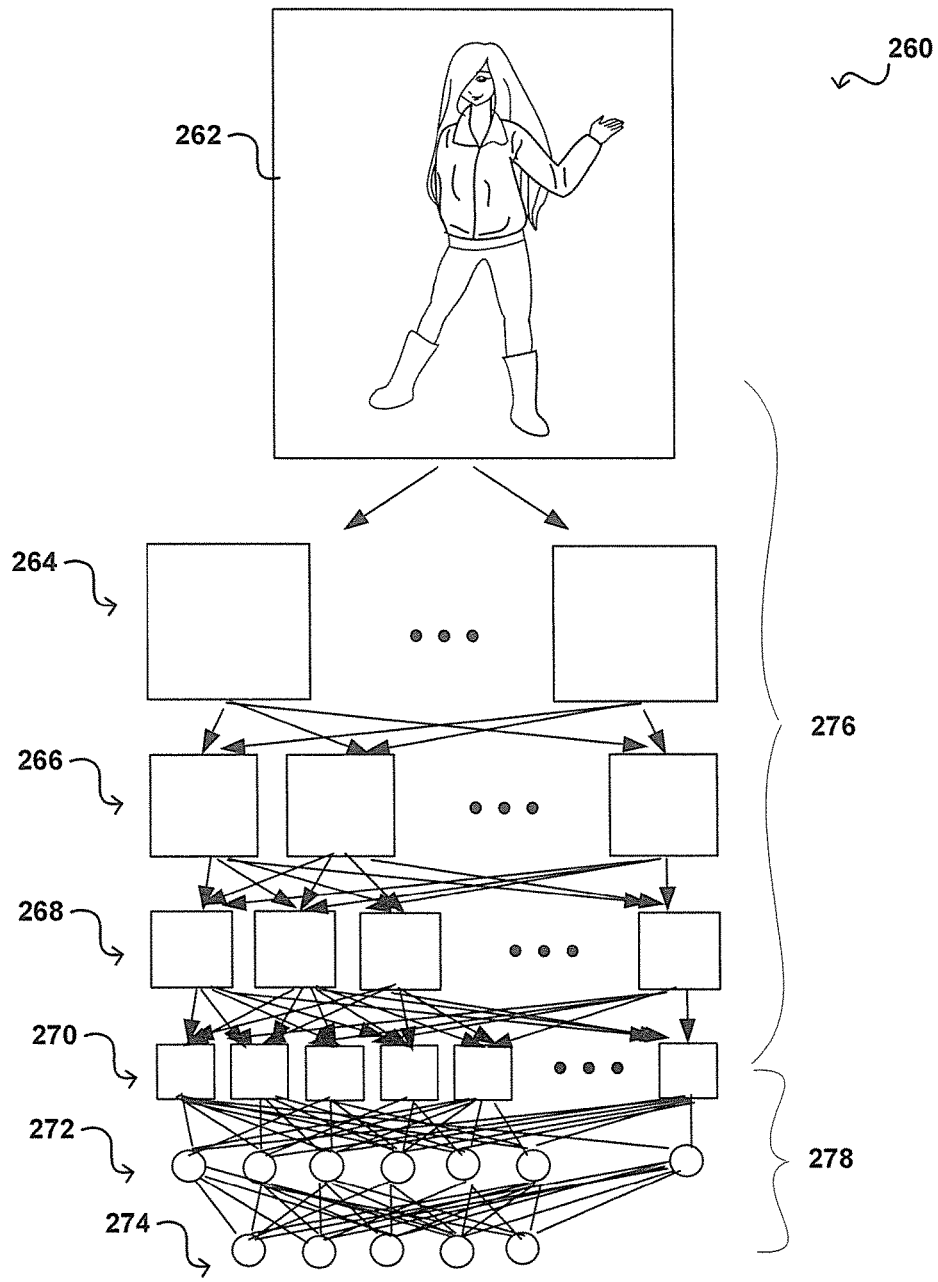

FIG. 2C illustrates an example convolutional neural network (CNN) 260 that can be utilized in accordance with various embodiments. Convolutional neural networks are a family of statistical learning models using in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. In FIG. 2C, there is an input layer 262 which along with a set of adjacent layers 264, 266, 268, 270 forms the convolution portion 276 of the example network 260. The bottom layer 270 of the convolution layer along with the lower layer 272 and output layer 274 make up the fully connected portion 278 of the network. From the input layer, a number of output values can be determined from the output layer, which can include several items determined to be related to an input item, among other such options. CNN is trained on a similar data set (which includes dress, pants, watches etc.), so it learns the best feature representation for this type of image. Trained CNN is used as a feature extractor: input image 262 is passed through the network 260 and intermediate outputs of layers 268, 270, and 272 can be used as feature descriptor of the input image 262. Similarity scores can be calculated based on the distance between the one or more feature descriptors and the one or more candidate content feature descriptors and used for building relation graph.

A content provider can thus analyze a set of images, and determine all items that are worn together by a person in the images. New images can be received and analyzed over time, with images having a decay factor or other mechanism applied to reduce weighting over time, such that newer trends and fashions are represented by the relations in the relation graph. A relation graph can then be generated using these relationships, whereby for any item of interest 202 the graph can be consulted to determine items 208 that are related to that item in some way, such as by being worn or used together by one or more users. The relationships can be weighted, scored, or have another appropriate value as discussed, which can be representative of the number of times those items appeared together, the type of person (i.e., celebrity or athlete) wearing those items, etc. The weightings can also be affected by whether they are items of the same type or style, or whether they are merely complementary items. These weightings or scores can be provided to a ranking algorithm that can also utilize other factors, such as item relatedness, common purchases or views by other users, or other such information, to generate relatedness scores for the items. The related items can then be ranked by score, for example, with content for a number of the highest ranked items being provided as recommendations along with the primary content for the item of interest. This information also can be used to select advertising that may be relevant for display with the primary content, as well as other types of related, complementary, or supplemental content.

In order to determine the items in a particular image, it can be desirable in at least some embodiments to identify the portions of the image that correspond to a single person, as well as those that correspond to various items. This can involve any of a number of segmentation processes, which can be performed manually or automatically in various embodiments. In a manual process, a person can cut, crop, or otherwise specify portions of an image that correspond to different items, such as apparel items, jewelry, and the like. The person can then manually attempt to identify the items, or can cause the designated portions to be analyzed by an object recognition algorithm, for example, where the person may first specify a category or type of item to minimize the search space, or the object recognition algorithm can do a full search against an entire search space, such as an electronic catalog.

In other embodiments, an automatic segmentation process can be used to analyze the various images and attempt to segment the image into portions corresponding to a single person or entity, individual objects or items in the image, or other such segments. One example approach to segmenting an image is illustrated in FIGS. 3A-3D. A first step of such an approach can involve removing background portions of the image or otherwise removing from consideration any portions of the image that do not correspond to an item of interest, in order to improve the accuracy of the results and lessen the amount of data to be analyzed. In the situation 300 of FIG. 3A, an image 200 is obtained that includes an item 302 that is contained in an electronic catalog, in this case the item being a dress being worn by a person. It should be understood that in some images a person might not be present, or only a portion of a person might be represented, among other such options. In the example situation 310 of FIG. 3B, a cropping process begins by starting at the corners and/or edges of the image and moving each side of a rectangle 312 inward until an edge or portion of a contour of an object is detected. It should be understood that a rectangle is used here for speed and simplicity because the image of interest is rectangular, but that other shapes can be used as well, such as squares, circles, and irregular shapes or contours. In some instances the background color will be known such that the process can move inward until a region with a color other than the background is determined. In other embodiments, the background color may need to be determined or background objects in the image removed using any appropriate process known or used for such purposes in other image-related processes.

Figure 3A:
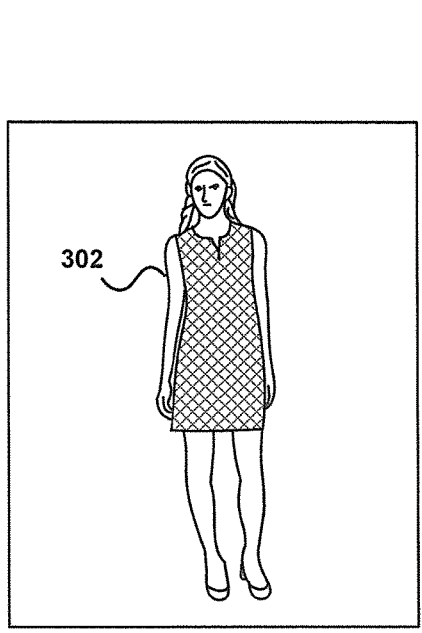
FIGS. 3A, 3B, 3C, and 3D illustrate example approaches for removing background from an image that can be utilized in accordance with various embodiments.
Figure 3B:
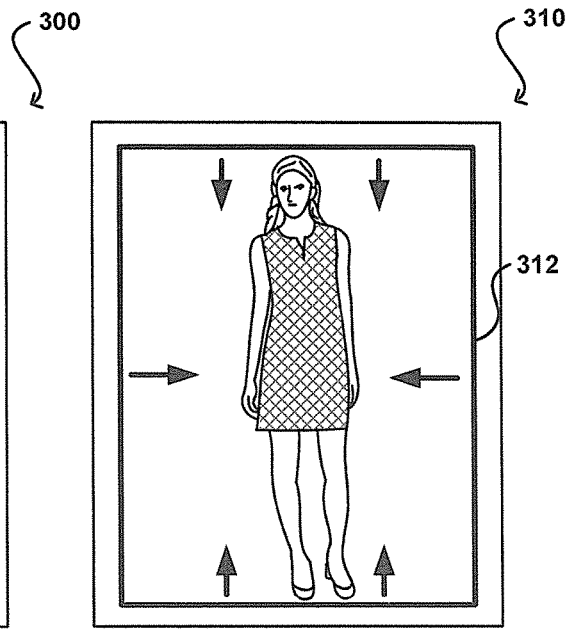
Figure 3C:
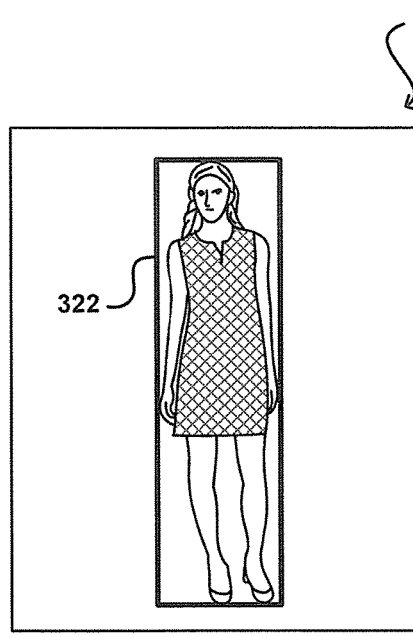

After each edge has stopped at an edge or contour of an object, a rectangularly-bound region 322 of the image will be determined that will include the item of interest, as illustrated in the example situation 320 of FIG. 3C. For images that contain models wearing various items, this can help reduce the search space to the items worn by a single person. The image in some embodiments can then be cropped to this region, such that the background pixels previously located outside this region in the image are removed from the image file.

In at least some embodiments, a different approach can be taken to attempt to determine the region corresponding to the object versus the background region. For example, an attempt can be made to locate and/or grow connected regions of background color (or ranges of background color) from the corners or sides of the image towards the center of the image, to the extent possible. A connected component analysis, for example, can be utilized to attempt to connect the entire background region of the image, with the remaining region(s) being considered potential objects(s) of interest. In example situation 330 of FIG. 3D, an outline or mask region 332 can be determined that then corresponds to the foreground (or background) portion of the image. This can be used to crop the image based on the location of the object, or can be used to expand the object to the appropriate aspect ratio, as discussed elsewhere herein.

Figure 3D:
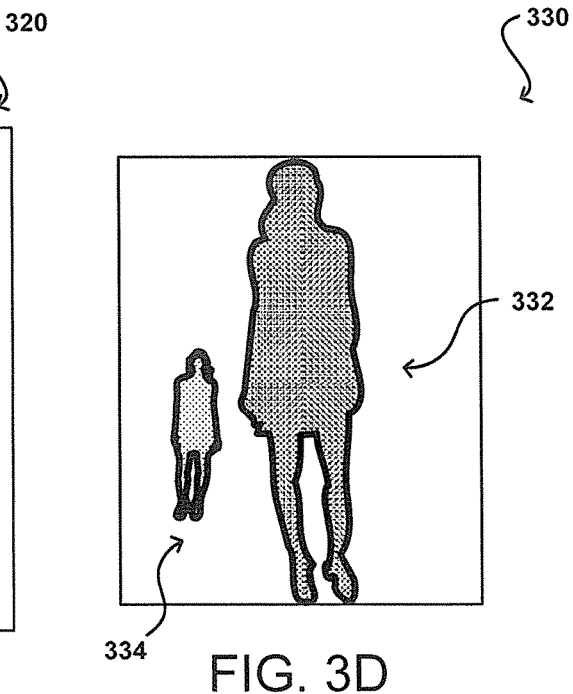

If the image includes multiple objects, such as a second person as illustrated in the example of FIG. 3D, the connected components analysis can still connect the background regions, which can result in determining a second object region 334 in the image. Various approaches can then either consider these objects together or as separate objects for purposes of cropping or image match. For images with multiple such object regions, one or more rules or policies could be utilized that indicate to select only the top region, most central region, largest region, etc.

Figure 4A:
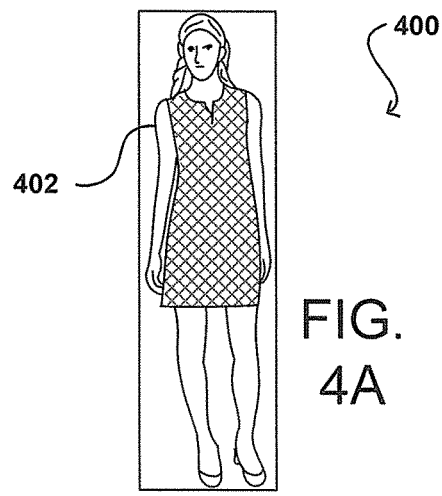
FIGS. 4A, 4B, and 4C illustrate an example approach to locating specific items represented in an image that can be utilized in accordance with various embodiments.
Figure 4B:
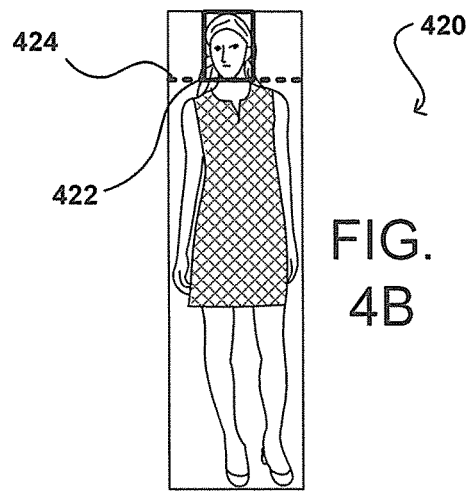

In at least some embodiments, a next portion of the process involves cropping the image based at least in part upon a location of a face of the wearer in the image. As illustrated in the example situation 400 of FIG. 4A, the input 402 can be the cropped image from FIG. 3D that has minimal background, although other versions of the image can be utilized as well within the scope of the various embodiments. From such an image, a face or head recognition process (i.e., a process using a Viola-Jones or deformable parts model (DPM)-based face recognition algorithm) can be used to attempt to locate a face or head in the image, at least in the upper portion (e.g., top half or quarter) of the image. As illustrated in the example situation 420 of FIG. 4B, a location or bounded region 422 identifying the location of such a face can be determined using an appropriate location algorithm as discussed elsewhere herein. From this region, an appropriate location for cropping can be determined. The appropriate location can depend at least in part upon the type of items to be recognized. For example, if the items include earrings and glasses then the location might be the top third of the person's head. If the items are only clothing, then the appropriate crop location might be at the bottom of the person's face, or just above the bottom in order to account for collars or other such features. If hats are to be considered then no cropping may be performed, but the location of the face may be used to segment out a potential hat portion of the image from the other portion of the image.

Figure 4C:
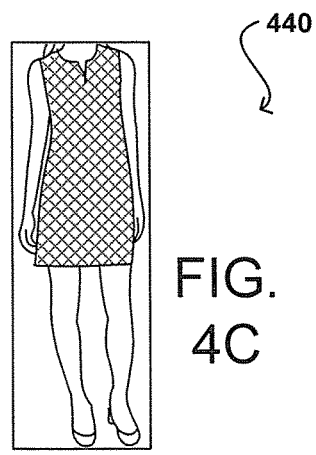

In this example, the location is the bottom of the head or face region in the up/down direction (in the figure). Such a point can be used to determine the new edge location 424 of the image, which passes through that point and parallel to the upper edge of the image (in the figure). It should be understood that terms such as "up" and "down" are used for purposes of explanation and that other arrangements or directions can be used as well within the scope of the various embodiments as appropriate. Using this edge location, the image can be cropped (or image data ignored) to remove the portion above that location, as illustrated in the example situation 440 of FIG. 4C. It should be understood, however, that processes other than traditional "cropping" can be used as well within the scope of the various embodiments. For example, pixels in the "cropped" or "cropped out" regions might have their values stored as metadata in the image, or set to an invisible or transparent setting, among other such options, such that the object appears to be cropped but the information is still in the image such that the original image can be recreated from the manipulated or "cropped" image if desired.

Figure 5A:
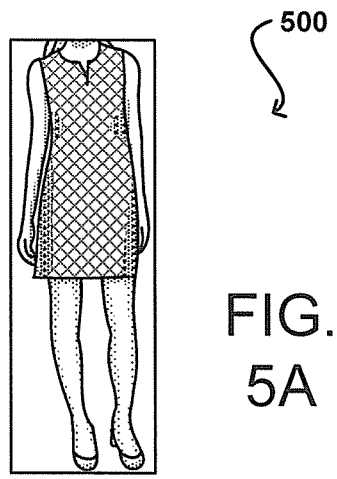
FIGS. 5A, 5B, and 5C illustrate an example approach to locating specific items represented in an image that can be utilized in accordance with various embodiments.
Figure 5B:
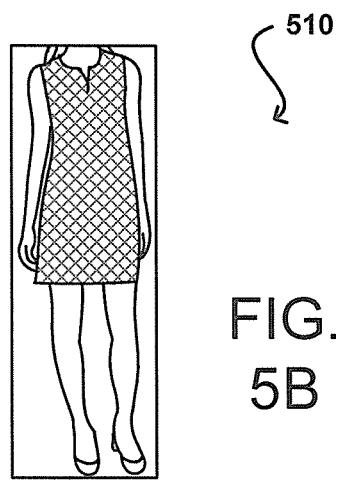
Figure 5C:
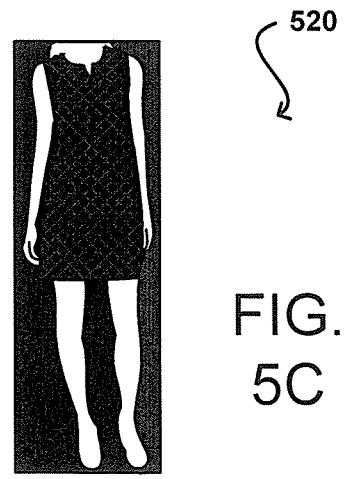

In this example, the cropped image can be used as input to the next portion of the process. In the example situation 500 of FIG. 5A, it can be seen that the cropped image is provided that will likely be a full color (e.g., 24 bit) image, or other such image with a conventional color depth. In order to locate the leg regions without utilizing a complex image recognition process, approaches in accordance with various embodiments can attempt to locate regions of skin color or skin tone that are positioned in a way that would be expected for legs in the image. The skin colors can have ranges of values that can depend at least in part upon the color space, color depth, etc. In order to improve accuracy, in at least some embodiments a version of the cropped image is produced, as illustrated in the example situation 510 of FIG. 5B, which is quantized, or has a reduced color depth. Reducing the color depth to, say, 256 bit color, can cause the skin regions to have less color variation and thus be more likely detected as contiguous regions of skin color. From the quantized image, the color of each pixel in the image can be analyzed to determine whether each pixel is, or is not, colored with a color that is within the range of skin tones. For pixels in that range, those pixels can be assigned a first value, such as 0. For pixels with colors outside the skin color range, those pixels can be assigned a second value, such as 1. The result will then be a mask image, such as is illustrated in the example situation 520 of FIG. 5C, wherein the regions of skin are identified with respect to the non-skin regions. For example, the leg and arm regions of the image are readily identifiable from the skin mask image.

Figure 6A:
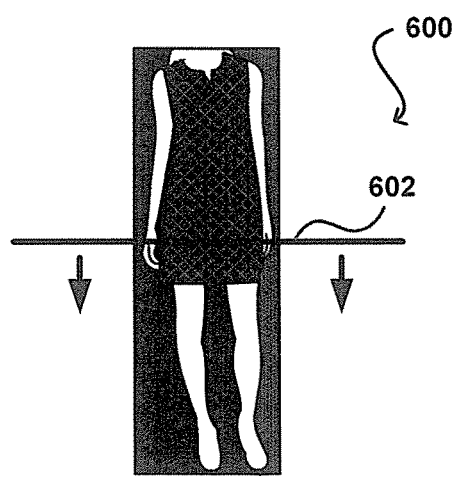
FIGS. 6A, 6B, 6C, 6D, 6E, and 6F illustrate an example approach to locating specific items represented in an image that can be utilized in accordance with various embodiments.

Once a skin mask (or similar binary version) is created, that image can be analyzed to attempt to determine the presence of legs in the image, as well of the positions of any such legs. For example, in the situation 600 of FIG. 6A a scan (represented by the scan line 602) can start at, or slightly above, the half-way point of the image from top to bottom. This is a reasonable place to start as legs will typically be located in the bottom half of the image, and starting here helps to reduce false positives that might otherwise be detected in the top half of the image. From this point, the scan line can move line by line (or every other line, etc.) towards the bottom of the image and attempt to locate scan lines where transitions between skin and non-skin regions indicate the potential presence of legs. For example, in the situation 610 of FIG. 6B two scan line regions are illustrated where there are regions of skin and non-skin on the scan line. Any scan line that includes one or two areas of skin may be designated as a potential leg position, as the legs could be apart or could be together, where they might appear as a single skin region. A first pair of skin regions is designated by two segments 612, 614 that appear on the same scan line and are separated by a non-skin region. Similarly, a second pair of skin regions is also designated by two segments 616, 618 that appear on the same scan line and are separated by a non-skin region. Based on the scanning of the mask alone, it would be difficult to say with certainty which of these scan line segments correspond to legs and which correspond to arms.

Figure 6B:
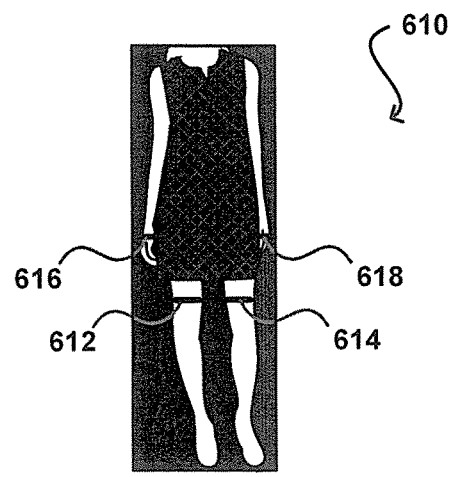
Figure 6C:
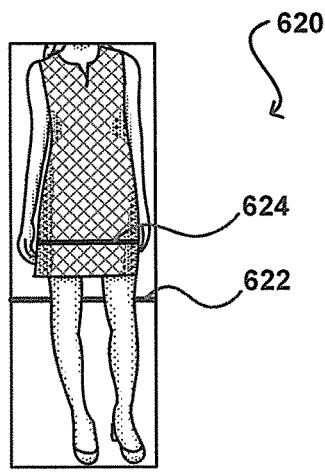
Figure 6D:
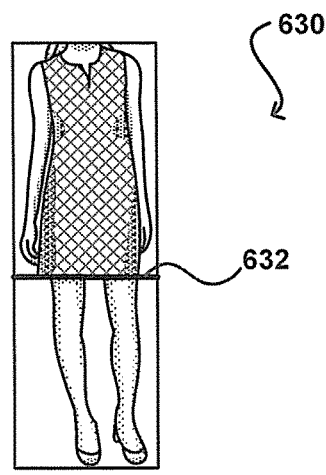

Accordingly, the process also utilizes a version of the image as illustrated in the situation 620 of FIG. 6C, which can be a full color, reduced color, or grayscale image, among other such options. In this example, the image is a grayscale image and areas of background can be distinguished from areas of non-background color. In this case, a set of scan line segments 622 corresponding to the first pair of segments 612, 614 in FIG. 6B shows that only background is located between the skin regions. Such a determination can be made by computing some edge features from a scan line or row of pixels, then processing these features using a classifier algorithm (e.g., hand-trained classifier, trained decision tree, etc.) to determine whether the row contains a dress and hands, a part of clothing, a pair of legs, etc. Based on at least this information, it can be determined from the example that the segments likely correspond to legs. A second scan line segment 624 corresponding to the second pair of scan line segments 616, 618 indicates that, based on the color value of the pixels along the scan line between the skin region, the area between the skin regions is not background, which indicates that these regions are likely not leg regions, as a dress that stops at the knees, for example, would not have anything (typically) between the legs of the wearer below the knee. Further, the skin regions may be determined to be too thin, too far apart, or otherwise have aspects or dimensions that are indicative of not corresponding to legs in the image. By performing such a process down some, most, or all of the lower half of the image, for example, it can be determined that the visible portion of the legs starts at a particular scan line 632 as illustrated in the situation 630 of FIG. 6D. This may not be a precise determination due to the shape and deformability of the dress or skirt, but such precision may not be necessary for at least some embodiments. Once located, the image can be cropped to yield an image as illustrated in the situation 640 of FIG. 6E. If a connected components-based approach was used as discussed elsewhere herein, the determination of background pixels between the leg regions can improve the confidence of the determination.

Figure 6E:
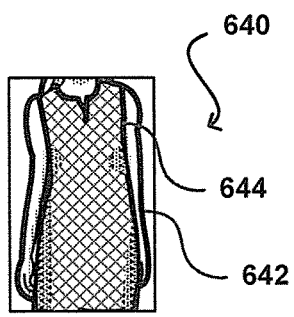
Figure 6F:
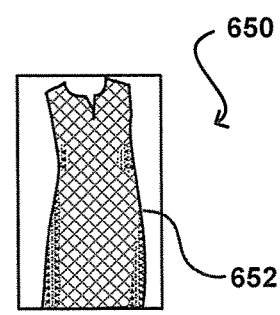

The image in the situation 640 of FIG. 6E is cropped top to bottom to approximately the location of an item of interest. From earlier steps, the contour 642 from the connected components analysis and a contour 644 from the skin tone region analysis can be used to further remove portions of the image from consideration. For example, any remaining points in the image outside the connected components contour 642 can be excluded from further analysis. Similarly, any points that were determined to correspond to regions of skin tone, inside a skin region contour 644, for example, can also be excluded, although as mentioned in some embodiments such an approach may not be used for image regions with a very high percentage of skin tone pixel values, or low deviation from skin tone, as that might correspond to a dress or other item having a color within the skin spectrum. If the skin tone and connected components contour are used to exclude points from consideration, the remaining image illustrated in the situation 650 of FIG. 6F will include pixel values almost exclusively that correspond to a region 652 of the item of interest. This can help to automatically generate an image of the item to be used with suggestions, for example, but also can enable the correct portion of the input image to be used for object identification or image matching, and will likely result in far more accurate results that matching against the entire image. While such an approach may not be as accurate as running the image through a very complex image analysis routine, the process will be much faster and require far fewer resources. If the image of FIG. 6F is run through an image match process and several possibilities show up with all with relatively low confidence scores, the image can be further analyzed to attempt to determine whether the region includes multiple items, such as a top and a skirt instead of a dress, such that the image portions for those items can be searched separately. This can be done, for example, by looking for different colors or patterns, doing an edge analysis, performing another connected components analysis, or performing another image segmentation process as discussed or suggested herein.

A segmentation process can thus be used to identify portions of an image that correspond to a particular item, so that the item can be identified using an object recognition algorithm against an appropriate electronic catalog or other data repository. If a match is located, information for the matching object can be used to attempt to search for related items. The search might be more valuable, however, if visual aspects of the image can be searched as well. For example, if the object is a red high heel shoe, then instead of only searching the specific matching shoe (which might only have a couple of data points) it might be advantageous to search against data for visually similar products, such as products with similar shapes, colors, patterns, textures, and other such aspects. This can also help when products in the catalog correspond to multiple sources, such that the same item might have multiple entries that may not be identifiable automatically without determining the visual similarities. By locating these similar objects the data for those objects can be aggregated and analyzed to determine a more accurate set of recommendations, or at least recommendations based on more data points.

In order to determine visually similar products in at least some embodiments, some analysis of the input image data for a item is analyzed in order to determine something about the visual characteristics of the item. In some embodiments, this involves the generation of one or more descriptors, such as histogram descriptors, that can be useful for searching and classifying content, among other such actions. Before describing approaches to creating and using histogram descriptors to search and classify content, it may be helpful to provide an example procedural context. In a process for searching histogram descriptors that characterize a collection of content, an index tree can be built using a set of histogram descriptors. Building the index tree may involve significant use of computation resources and time, such that this may correspond to a preparatory step to servicing search requests and/or performed relatively infrequently with respect to search request servicing and/or according to a schedule.

When a query is received, for example, a set of query descriptors may be obtained or determined for the query content. For example, if the query content is not part of an electronic catalog and does not already have associated histogram descriptors, the system may generate histogram descriptors for the query content in a same and/or similar manner that the histogram descriptors are generated for the collection of content, as described below. Also, for example, if the query content is part of the collection then the histogram descriptors for the query content may be obtained from the appropriate data store. The index tree can then be searched to identify a set of candidate content histogram descriptors. Similarity scores can be calculated based on the distance between the one or more query histogram descriptors and the one or more candidate content histogram descriptors. For example, a search module may determine the distances with respect to the metric of the descriptor space in which the query histogram descriptors and the content histogram descriptors are located (e.g., as points or vectors). A set of nearest content histogram descriptors may be selected. For example, the search module may select a subset of the candidate content histogram descriptors nearest the query histogram descriptors with respect to the similarity scores. Content in the collection associated with the subset of nearest content histogram descriptors selected may be provided for presentation, resulting in a presentation of content from the collection that is similar to the query content.

In an example process for creating a first type of histogram descriptor for a collection of images, the histogram descriptors can be local-texture histogram descriptors that describe patterns that exist in individual images of the collection. For example, if an image is of a shoe that has laces and a checker-board pattern, the local-texture descriptor provides a representation of the checker-board pattern and the laces. An example process of creating local-texture histogram descriptors for individual images in a collection begins with identifying the feature points of the images of the collection. Feature points are specific points in an image which are robust to changes in image rotation, scale, viewpoint, or lighting conditions. Feature points are sometimes referred to as points of interest. For example, to identify feature points of an image, the image may be smoothed and down-sampled into image pyramids, each of which contain several pyramid images. Feature points may then be identified in the pyramid images by finding the Harris corner measure at different points in the pyramid images. For example, the local maxima in the Harris corner measure may be identified as feature points. According to some embodiments, these identified feature points are invariant to certain transformations of the images, like zooming, scaling and rotation of the image. Examples of feature points are illustrated at 704 in FIG. 7A.

After the feature points of the images are identified, feature vectors for the feature points are calculated. To calculate feature vectors of the item image 702, the orientations of the feature points 704 are determined. For example, a set of orientation calculating algorithms may use the gradient of the image 702 to determine the orientations of the feature points 704. Then patches 708 are extracted around each of the feature points 704. The patches 708 are then converted to feature vectors using standard techniques. The feature vectors of image 702 are represented at 710 in FIG. 7A. Examples of suitable feature vectors include scale-invariant feature vectors such as "SIFT keys" as known in the art.

Figure 7A:
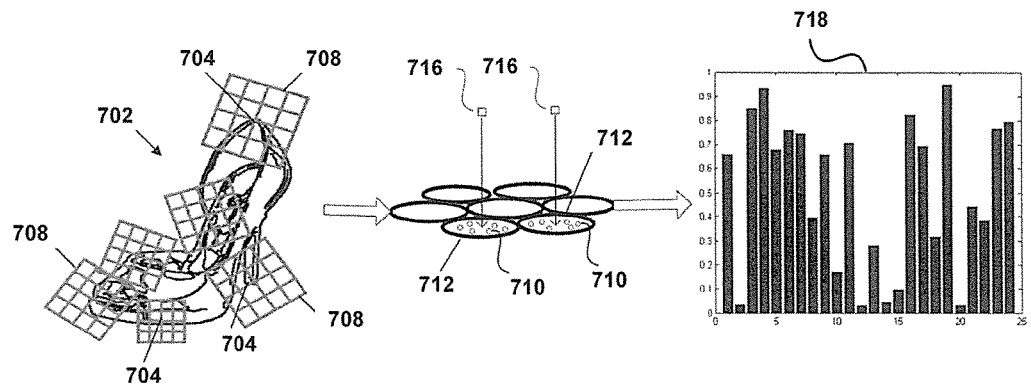
FIGS. 7A, 7B, and 7C illustrate an example approach to determining visually similar items that can be utilized in accordance with various embodiments.

After the feature vectors of the images of the collection are calculated, clusters are created and the feature vectors are sorted into the clusters. For example, when creating an index tree for the image collection, the index module may cluster the feature vectors of the images into the respective clusters. For example, the index module may create clusters and sort feature vectors to the clusters by utilizing a conventional hierarchical k-means clustering technique. FIG. 7A schematically illustrates nodes or clusters 712 having feature vectors 710 clustered therein. For clarity, only two of the clusters 712 are labeled and not all clusters 712 are shown having feature vectors 710 clustered therein. However, it should be appreciated that any number of clusters 712 may exist and that each of the clusters 712 can include feature vectors 710.

A cluster descriptor can be determined for each of the clusters in at least some embodiments. Like feature vectors, cluster descriptors may be viewed as vectors in a vector space. Furthermore, cluster descriptors may be based at least in part on the feature vectors of the clusters they characterize. For example, an index module may calculate a cluster descriptor for a cluster, where the cluster descriptor corresponds to a point in the descriptor space that is a mean and/or a center (e.g., a geometric center) of the feature vectors in the cluster. FIG. 7A schematically illustrates cluster descriptors at 716. As indicated above, the cluster descriptor 716 of a particular cluster 712 corresponds to the mean and/or center of the feature vectors 710 that are grouped in the cluster 712.

In addition to providing a cluster descriptor for each cluster, a visual word can be provided for each cluster. According to some embodiments, visual words are labels that represent clusters but, unlike the cluster descriptors, do not include location information for the clusters. Accordingly, by excluding location information from the visual words, the visual words may be categorized, searched, or otherwise manipulated relatively quickly. In operation, an index module can assign a visual word to each of the clusters. According to some embodiments, the steps of identifying feature points, calculating feature vectors, clustering feature vectors, calculating cluster descriptors, and assigning visual words may be part of an initial build phase of building the index tree. After an initial build phase, the index tree can be further developed and refined as additional images are added to the collection of images.

A local-texture histogram can be created for the images of the collection of images. According to an embodiment, each local-texture histogram is created with a number of bins that correspond to the number of clusters created for the collection. Because each cluster is associated with a visual word, the number of bins also corresponds to the number of visual words assigned to the collection. Each bin of a particular local-texture histogram is populated with data that indicates the number of the feature vectors of the image that were mapped to the cluster that corresponds to the bin. Accordingly, because each cluster is represented by a visual word, the data included in a bin of a local-texture histogram of an image indicates the number of feature vectors associated with each visual word. An example local-texture histogram 718 is provided in FIG. 7A. In operation, to create a local-texture histogram 718 for an item image 502, the histogram module creates a bin for each visual word that was created. Then, the histogram module provides each bin with data that indicates the number feature vectors assigned to the visual word associated with the bin.

Figure 7B:
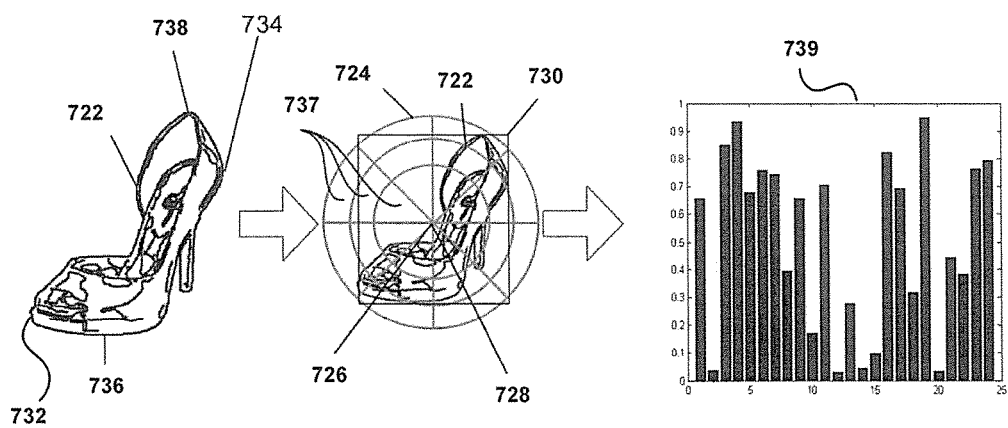

Another example process can create a second type of histogram descriptor for the images of the collection of images in accordance with at least one embodiment. Further, FIG. 7B provides a schematic diagram of creating the second type of histogram descriptor for an example image 702 in accordance with at least one embodiment. These histogram descriptors are global-shape histogram descriptors that describe the overall shape of the image. For example, if an image is of a shoe, the global-shape histogram descriptor provides a representation of the overall shape of the shoe. Such a process begins with creating edge images of the images of the collection. It should be appreciated that edge images may be created using any techniques and methods known in the art, such as edge detection algorithms that use Canny edge detection or Sobel operators. According to some embodiments, when creating edge images for the images, the step of thinning, which is associated with most edge detection techniques, may be omitted because the global-shape histogram descriptors are robust to edge detection techniques that result in thick edges. An example edge image is illustrated in FIG. 7B at 722.

After edge images of the images are created, radial-polar grids are positioned with respect to the edge images. An example radial-polar grid 724 is illustrated in FIG. 7B as being positioned over the edge image 722. According the embodiment represented in FIG. 7B, a center 726 of the radial-polar grid 724 is aligned with a center 728 of a bounding box 730 of the edge image 722. The bounding box 730 is defined by a left-most pixel 732, a right-most pixel 734, a bottom-most pixel 736, and a top-most pixel 738 of the edge image 722. Each of the radial-polar grids comprises radial-polar bins. For example, as illustrated in FIG. 7B, the radial-polar grid 724 includes a plurality of radial polar bins 737. Although, for illustrative convenience, only three radial-polar bins 737 are indicated, the illustrated radial-polar grid 724 comprises twenty-four radial polar bins in at least some embodiments. It should be appreciated that the number and size of radial-polar bins of the radial-polar grid may vary relative to the underlying edge image. For example, tuning the radial-polar grid to return the best results may be accomplished by varying the number and size of the radial-polar bins. According to some embodiments, the number and size of the radial-polar bins are varied by varying the size and number of angular bins and radial bins of the radial-polar grid. According to some embodiments, the number of angular bins range from eight to sixteen and the number of radial bins range from three to eight. For example, tuning may be performed by visual inspection of the similarity results and comparison of the similarity results against a human labeled ground truth collection. After radial-polar grids are positioned and tuned over the edge images, the number of pixels of the edge images that are located in the radial-polar bins of the radial-polar grids are determined. For example, with reference to FIG. 7B, after a radial-polar grid 724 is positioned and tuned over the edge image 722, the process contemplates counting the number of pixels of the edge image that are located in each radial-polar bin of the radial-polar grid.

Next, a global-shape histogram is created for the images in the collection of images. According to an embodiment, each global-shape histogram is created with a number of bins that correspond to the radial-polar bins of the radial-polar grid positioned on the edge image of the image, where the contents of the bins include data that represents the number of pixels in the corresponding radial-polar bins. An example global-shape histogram 739 is provided in FIG. 7B. In operation, to create a global-shape histogram 739 for an image 722, the histogram module creates a bin for each radial-polar bin of the radial-polar gird. Then, the histogram module assigns data to each bin of the histogram that reflects the number of pixels of the edge image that are located in corresponding the radial-polar bin. Accordingly, the global-shape histogram indicates the number of radial-polar bins that are positioned over the edge image and the number of pixels of the edge image that are located in each the respective radial-polar bins.

Figure 7C:
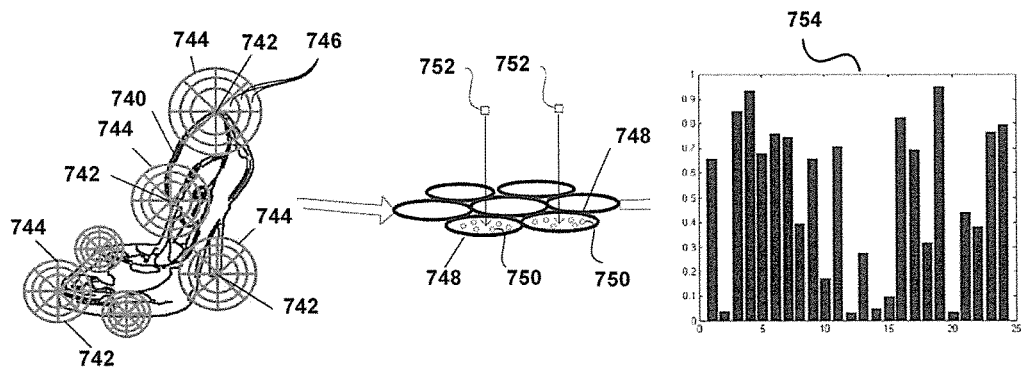

An example process for creating a third type of histogram descriptor for the images of the collection of images creates are local-shape histogram descriptors that describe the local shape of the object reflected in the image. In this example, edge images of the images of the collection are created. As mentioned above, it should be appreciated that edge images may be created using any techniques and methods known in the art, such as edge detection algorithms that use Canny edge detection or Sobel operators. Further, when creating edge images for the images, the step of thinning, which associated with most edge detection techniques, may be omitted in some embodiments because the local-shape histogram descriptors are robust to edge detection techniques that result in thick edges. An example edge image 740 of an image is illustrated in FIG. 7C.

Next, feature points for the edge images of the images of the collection are determined. To determine feature points for an edge image 740, the original image that corresponds to the edge image 740 may be smoothed and down-sampled into image pyramids, each of which contain several pyramid images. Feature points 742 may then be identified in the pyramid images of the original image by finding the Harris corner measure at different points in the pyramid images. For example, the local maxima in the Harris corner measure are identified as feature points. The feature points of the original image may then be applied to the corresponding edge image 740. It should be appreciated that, instead of identifying feature points of the original image and then applying those feature points to the edge image, embodiments could identify the feature points of the edge image itself. For example, embodiments could smooth and down-sample the edge image into image pyramids and then identify the feature points of the pyramid images of the edge images using Harris corner detection. According to some embodiments, these identified feature points are invariant to certain transformations of the images, like zooming, scaling and rotation of the image.

After the feature points of edge images are identified, radial-polar grids are positioned on the feature points of the edge images. Example radial-polar grids 744 are illustrated in FIG. 7C as being positioned over feature points 742 of the example edge image 740. Each of the radial-polar grids comprises radial-polar bins. For example, as illustrated in FIG. 7C, each of the illustrated radial-polar grids 744 includes a plurality of radial polar bins 746. Although for illustrative convenience only three of the radial-polar bins 746 of one radial-polar grid 744 are illustrated, it should be appreciated that each of the illustrated radial-polar grids 744 comprise twenty-four radial polar bins 746 in at least some embodiments. It should also be appreciated that the number and size of radial-polar bins of the radial-polar grid may vary. For example, the radial-polar grids may be tuned by varying the number and size of the radial-polar bins. According to some embodiments, the number and size of the radial-polar bins are varied by varying the size and number of angular bins and radial bins of the radial-polar grids. According to some embodiments, the number of angular bins of each of the radial-polar grids range from eight to sixteen and the number of radial bins of the radial-polar grids range from three to eight.

After radial-polar grids are positioned over the feature points of the edge images, the number of pixels of the edge images that are located in the radial-polar bins of the radial-polar grids is determined. For example, with reference to FIG. 7C, after a radial-polar grids 744 are positioned over the feature points 742 of the edge image 740, the process contemplates counting the number of pixels of the edge image 740 that are located in each radial-polar bin 746 of each radial-polar grid 744.

Edge histograms can then be created for each of the feature points of the images in the collection of images. According to an embodiment, each edge histogram is created with a number of bins that correspond to the radial-polar bins of the radial-polar grids positioned on the feature points of edge images of the images, where the contents of the bins of the edge histograms represent the number of pixels in the corresponding radial-polar bins.

After edge histograms are created for the feature points of the images of the collection, clusters are created and the edge histograms are sorted into the clusters. In FIG. 7C the clusters 748 and the edge histograms 750 are schematically illustrated. For clarity, only two of the clusters 748 are labeled and not all clusters 748 are shown having edge histograms 750 clustered therein. However, it should be appreciated that each of the clusters 748 can include edge histograms 750. For example, when creating the index tree for the collection, the index module 21 may cluster the edge histograms 750 of the images into the respective clusters 748. For example, as mentioned above the index module may create clusters and sort edge histograms to the clusters by utilizing a conventional hierarchical k-means clustering technique.

A cluster descriptor can then be determined for each of the clusters. For example, if the edge histograms are converted to vectors, the cluster descriptors may be based at least in part on the vectors that represent the edge histograms in each cluster. For example, in operation the index module may calculate a cluster descriptor for a cluster, where the cluster descriptor corresponds to a point in the descriptor space that is a mean and/or a center (e.g., a geometric center) of the vectors in the cluster that represent the edge histograms of the cluster. FIG. 7C schematically illustrates cluster descriptors 752. As indicated above, the cluster descriptor 752 of a particular cluster 748 correspond to the mean and/or center of the vectors that represent the edge histograms 750 that are grouped in the cluster 748.

In addition to providing a cluster descriptor for each cluster, a visual word can be provided for each cluster. According to some embodiments, the visual words are labels that represent the clusters but, unlike the cluster descriptors, the visual words do not include location information for the clusters. Accordingly, by excluding location information from the visual words, the visual words may be categorized, searched, or otherwise manipulated relatively quickly. In operation, according to an embodiment, the index module assigns a visual word to each of the clusters.

A local-shape histogram 754 can be created for each of the images in the collection. According to an embodiment, each local-shape histogram is created with a number of bins that correspond to the number of clusters created for the collection. Each bin of a particular local-shape histogram is populated with data that indicates the number of the edge histograms of the image that were mapped the visual word that corresponds to the bin. Accordingly, because each visual word represents a cluster, the data included in a bin of a local-shape histogram of an image indicates the number of edge histograms of the image that were mapped to the cluster represented by the bin. To create a local-shape histogram 754 for an image of the collection, a histogram module can create a bin for each visual word that was created. Then, the histograms module provides each bin with data that indicates the number of edge histograms assigned to the visual word associated with the bin.

In light of the example processes for generating local-texture, global-shape, and local-shape histogram descriptors in accordance with at least one embodiment, it will be helpful revisit the example procedural context provided above. As mentioned above, an index tree may be built around any of the local-texture, global-shape, and local-shape histogram descriptors. A search module may receive a request to identify images in the collection that are visually similar to a query image. For example, the search request may include the query image or a reference to the query image. Local-texture, global-shape, and/or local-shape histogram descriptors are obtained or determined for the query image. If the query image is not part of the collection and does not already have associated histogram descriptors, the search module may generate local-texture, global-shape, and/or local-shape histogram descriptors for the query image in a same and/or similar manner that the histogram descriptors were generated for the collection of content. If the query image is part of the collection, the histogram descriptors for the query image can be obtained an appropriate location storing the already-generated histogram descriptors for the query image.

The collection of images may be searched to identify a set of content images that are similar to the query image. Since histogram descriptors have been calculated or obtained for the query image, comparing images can be accomplished by comparing the histogram descriptors of query images to the histogram descriptors of the images of the collection. For example, distances may be determined between the local-texture, global-shape, and local-shape histogram descriptors of the query image and the local-texture, global-shape, and local-shape histogram descriptors of the images in the collection of images. According to some embodiments, dot product comparisons are performed between the histogram descriptors of the query image and the corresponding histogram descriptors of the images of the collection. The dot product comparisons are then normalized into similarity scores. Thus, between any two images, three similarity score are provided: (1) a similarity score between the local-texture histogram descriptors of the images; (2) a similarity score between the global-shape histogram descriptors of the images; and (3) a similarity score between the local-shape histogram descriptors of the images. After similarity scores are calculated between the different types of histogram descriptors of the images, the similarity scores can be combined. For example, the similarly scores may be combined by a linear combination or by a tree-based comparison that learns the combinations. For example, using a linear combination may provide the advantage of enabling a user to assign different weights to the different types of histogram descriptors, thereby causing the search module to consider the weighting when selecting the nearest content histograms. It should be appreciated that instead of a dot product comparison, any distance metric could be used to determine distance between the different types of histogram descriptors, such as determining the Euclidian distance between the histogram descriptors.

After the combined similarity scores are determined, a set of nearest histogram descriptors may be selected. For example, the search module may select a subset of content histogram descriptors associated with images of the collection that are nearest the query histogram descriptors as determined by the combined similarity scores. Images in the collection associated with the subset of nearest histogram descriptors may be provided for analysis and/or presentation. For example, the search module may determine images in the collection that match the set of nearest content histogram descriptors selected at step and provide at least reference to the matching images. As mentioned, in various embodiments the references can be used with a recommendations module to generate recommendations for a user based on information known or obtainable with respect to the items for the matching images.

In some embodiments, contour images of images can be created and then used to generate histogram descriptors. Such a process generally begins with creating edge images. As mentioned above, it should be appreciated that edge images may be created using any techniques and methods known in the art, such as edge detection algorithms that use Canny edge detection or Sobel operators. Further, as mentioned above, when creating edge images for the images, the step of thinning, which is associated with most edge detection techniques, may be omitted in some embodiments because the contour histogram descriptors are robust to edge detection techniques that result in thick edges. Contour images can then be generated based at least in part upon the edge images. One example process begins with determining a contour of the left side of the edge image, which comprises rows and columns of pixels. To determine a contour of the left side of the edge image, a window can be traversed along the rows of the edge image from a position that is left of the left side of the image toward the left side of the edge image. According to an embodiment, the window is a small rectangle having a height that is approximately 4-5% of the height of the edge image and a width that is approximately 2-3% of the width of the edge image. Then, traversal of the window is stopped at a location where the window covers a threshold amount of pixels of the edge image and the pixels at that location are turned "ON." The threshold prevents identifying false edges, such as shadows, as being part of the contour of the image. According to some embodiments, the threshold is based on the percentage of the window that covers pixels of the edge image at any given time. According to an embodiment, the threshold amount is met if approximately 60% of the window covers a pixel at any given time. For example, the threshold may be met if approximately 60% of the rows of the window covers pixels of the edge image. According to this example, if the window is twenty pixel-rows tall by five pixel-columns wide and if at any time at least twelve of the twenty rows cover a pixel, then the result is a vector that is twenty pixels tall, where all pixels of the vector are "ON" and become part of the resulting contour image. After finding an "ON" position of the row, traversal of the window in that row stops and the window is moved to another row for traversal. If all of the rows of the edge image have been traversed, then the contour of the left side of the edge image has been defined and the process continues to the steps of defining the contour of the right side of the edge image. However, if not all of the rows have been traversed, the window can continue traversing the rows from left to right in order to define the contour of the left side of the image.

As an example, a window 800 can be traversed along one of the rows 802 from a left position generally indicated at 804 toward the left side 806 of an edge image 808. Then, traversal of the window 800 is stopped at a location 810 on the left side 806 where the window 800 covers a threshold amount of pixels. Pixels at this location can be turned "ON" and become part of the contour 812 of the left side of the edge image.

After the window has traversed all of the rows from left to right in order to define the contour of the left side of the edge image, the process continues to define the contour 814 of the right side of the edge image. The window 800 is traversed along one of the rows 802 from a right position generally indicated at 818 toward a right side 820 of the edge image 808. Then, traversal of the window 800 is stopped at a location 822 on the right side 820 where the window 800 covers a threshold amount of pixels. The pixels at this location are turned "ON" and become part of the contour 814 of the right side of the edge image. After the window has traversed all of the rows from right to left in order to define the contour of the right side of the edge image, the process continues to define the contour of the top side 816 of the edge image, which comprises rows and columns of pixels. A window is traversed down along the columns of the edge image from a top position that is located above the edge image, toward the top side of the edge image.

A window 824 is traversed along one of the columns 826 from a top position generally indicated at 828 toward the top side 830 of the edge image 808. Traversal of the window 824 is stopped at a location 828 on the top side 830 where the window 824 covers a threshold amount of pixels. The pixels at this location are turned "ON" and become part of the contour 816 of the top side of the edge image. After the window has traversed all of the columns from top to bottom in order to define the contour of the top side of the edge image, the process continues for defining the contour 832 of a bottom side 834 of the edge image 808. The window is traversed up from a bottom position that is located below the edge image toward the bottom side of the edge image. The window 836 is traversed along one of the columns 826 from a bottom position generally indicated at 838 toward the bottom side of the edge image 808. Traversal of the window 836 is stopped at a location 840 on the bottom side where the window covers a threshold amount of pixels. The pixels at this location 840 are turned "ON" and become part of the contour 832 of the bottom side of the image.

After completing these steps, a contour image for the edge image will have been created. According to some embodiments, a contour module can execute the process to create the contour images. It will be appreciated that the steps can be executed in various orders to create a contour image by defining, in any desired order, the left, right, top, and bottom contours of the image.

Figure 8A:
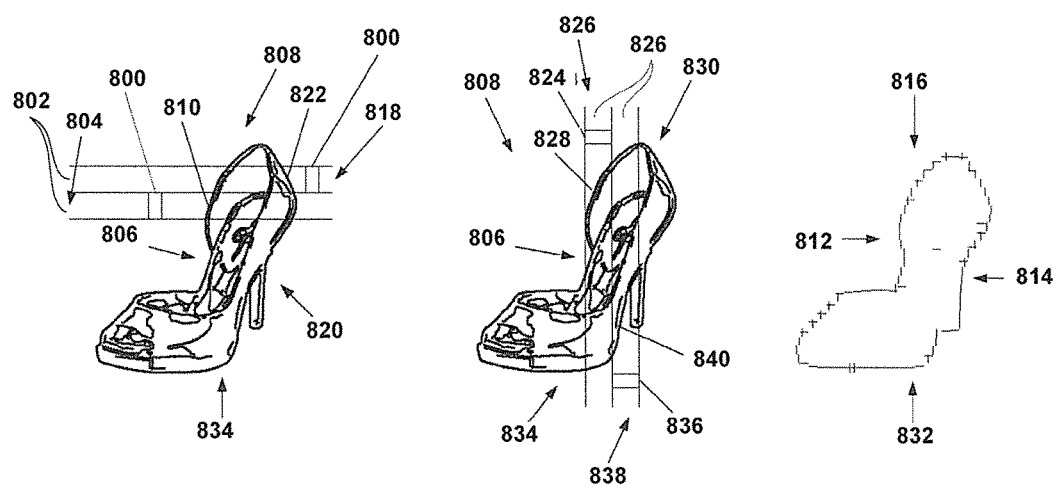
FIGS. 8A and 8B illustrate an example approach to determining visually similar items that can be utilized in accordance with various embodiments.
Figure 8B:
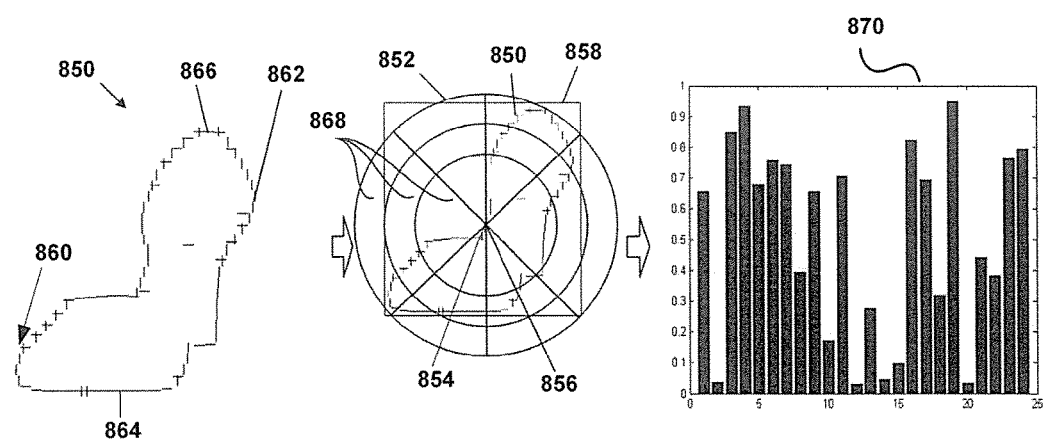

The example process of generating contour histogram descriptors for images involves positioning radial-polar grids on the contour images that were created as discussed herein. An example radial-polar grid 852 is illustrated in FIG. 8B as being positioned over the contour image 850. A center 854 of the radial-polar grid 852 is aligned with a center 856 of a bounding box 858 of the contour image 850. The bounding box 858 is defined by a left-most pixel 860, a right-most pixel 862, a bottom-most pixel 864, and a top-most pixel 866 of the contour image 850. Each of the radial-polar grids comprises radial-polar bins. For example, as illustrated in FIG. 8B the radial-polar grid 852 includes a plurality of radial polar bins 868. Although, for illustrative convenience, only three the radial-polar bins are indicated, the illustrated radial-polar grid 858 comprises twenty-four radial polar bins 868. It should be appreciated that the number and size of radial-polar bins of the radial-polar grid may vary relative to the underlying contour image. For example, the radial-polar grid may be tuned to return the best results by varying the number and size of the radial-polar bins. According to some embodiments, the number and size of the radial-polar bins are varied by varying the size and number of angular bins and radial bins of the radial-polar grid. According to some embodiments, the number of angular bins range from eight to sixteen and the number of radial bins range from three to eight. For example, tuning may be performed by visual inspection of the similarity results and comparison of the similarity results against a human labeled ground truth collection.

After radial-polar grids are positioned and tuned over the contour images, the number of pixels of the contour images that are located in the radial-polar bins of the radial-polar grids are determined. For example, with reference to FIG. 8B, after a radial-polar grid 858 is positioned and tuned over the contour image 850, the process contemplates counting the number of pixels of the contour image 850 that are located in each radial-polar bin 868 of the radial-polar grid 852. Next, histograms are created for the contour images. According to an embodiment, one histogram is created for each of the contour images and each histogram is created with a number of bins that correspond to the radial-polar bins of the radial-polar grid positioned on the contour image, where the contents of the bins represent the number of pixels in the corresponding radial-polar bins. An example histogram 870 is illustrated in FIG. 8B. In operation, to create a histogram 870 for the contour image 850, the histogram module creates a bin for each radial-polar bin 868 of the radial-polar gird 852. Then, the histogram module assigns data to each bin of the histogram that reflects the number of pixels of the contour image 850 that are located in the corresponding radial-polar bin 868. Accordingly, the histogram indicates the number of radial-polar bins that are positioned over the contour image and the number of pixels of the contour image that are located in each of the respective radial-polar bins.

In some embodiments, a process can then continue to attempt to classify images as being images of left- or right-facing objects. One such process begins with building a set of training images and associated contour histograms. According to some embodiments, the training images and corresponding training contour histograms are located in a data store that includes images and corresponding contour histograms of a number of different objects. According to some embodiments, the training images include two images of each object, one image of the object facing in a right direction and another image of the object facing in a left direction. Further, the training contour histograms include a histogram of a contour image of each image in the training images. The training histograms, according to some embodiments, are created as discussed above. Further, the training images can each include an indication of whether the object of the image is facing left or right. According to some embodiments, the indication of whether the object of the image is facing left or right may be determined by manual inspection.

A search module or similar component may receive a request to identify images in the collection that are visually similar to the query image. For example, the search request may include the query image or a reference to the query image. However, before visually similar images may be identified, according to some embodiments, a determination is made regarding whether the query image is of a left-facing or right-facing object, and then the search for visually similar images is limited to images of either left-facing or right-facing objects. To make the determination of whether the query image is of a left-facing or right-facing object, the histogram of the contour image of the query image is calculated and the histogram of the contour image of the query image is searched across the training contour histograms. The nearest of the training images can be selected by comparing the corresponding training contour histograms to the histogram of the contour image of the query image. The nearest of the training images is the training image that corresponds to the nearest training contour histogram. According to some embodiments, dot product comparisons performed between the histogram of the contour image of the query image and the training histograms, which correspond to the training images. It should be appreciated, however, that instead of a dot product comparison, any distance metric could be used to determine distance between the different types of histograms, such as determining the Euclidian distance between the vectors.

After the nearest training image is selected, the query image is classified as being an image of a right-facing or left-facing object based on whether the nearest training image is an image of a left-facing or right-facing object. After the query image has been classified as being an image of a left-facing or right-facing object, the collection of content can be searched for visually similar images, where the search is limited to images of the collection that are images of either left- or right-facing objects.

Figure 9:
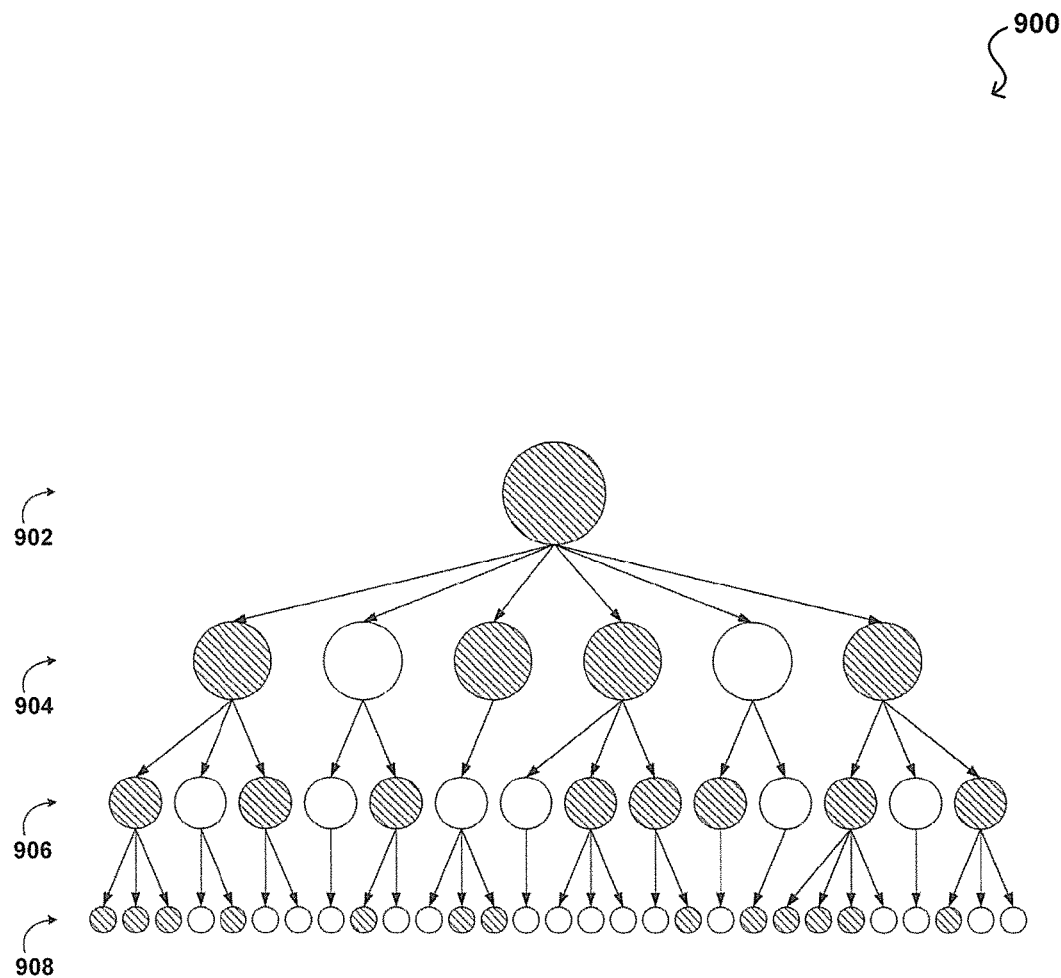
FIG. 9 illustrates an example categorization tree that can be utilized in accordance with various embodiments.

As described above, the collection of content may be categorized by content categories of a category tree. FIG. 9 depicts aspects of at least a portion of an example category tree 900 that can be utilized in accordance with at least one embodiment. The subset of the tree illustrated in FIG. 9 includes a subset of the categories in the category tree that are visually significant. The example category tree 900 has a first level 902 containing the root category of the category tree 900, second and third levels 904, 906 containing categories with one or more sub-categories or child categories, and a fourth level 908 containing childless categories or leaf categories of the category tree 900. In FIG. 9, categories in the visually significant subset of the category tree 900 are indicated by a circle filled with diagonal lines. Each visually significant category need not have a visually significant parent category in the category tree 900.

Visually significant categories in the category tree may be referenced and/or defined by the visually significant category data. The example visually significant category data includes multiple data objects each corresponding to one of a visually significant category data object, a parent item data object, a child item data object, and an image data object. The visually significant category data object may reference and/or define a particular category of the category tree as visually significant with a category identifier (ID) corresponding to the category. For example, each category in the category tree may be associated with a uniquely identifying string of alphanumeric characters, and the category ID may be a copy of the uniquely identifying string of the visually significant category. The visually significant category data object may further reference an item set of content in the collection of content corresponding to items that are categorized by the category having the category ID. For example, each item referenced by the collection of content may be associated with a uniquely identifying string of alphanumeric characters (an "item ID"), and the item set may include copies corresponding to the categorized items. The visually significant category data object may yet further reference an image set of images corresponding to items referenced by the item set. For example, each image corresponding to content in the collection of content corresponding to one or more items may be associated with a uniquely identifying string of alphanumeric characters (an "image ID"), and the image set may include copies corresponding to the referenced images. The visually significant category data object may still further include a similarity descriptor set including copies of similarity descriptors (e.g., histogram descriptors) corresponding to the images referenced by the image set.

In at least one embodiment, content in the collection of content corresponding to items is also arranged in an hierarchical structure. Some content may correspond to parent items having child items. For example, where items correspond to physical objects, a set of child items may correspond to physical variations of a parent item such as variations in size and/or color. Parent items may be represented in the visually significant category data with data objects corresponding to the parent item data object. Child items may be represented with data objects corresponding to the child item data object.

The parent item data object may reference a particular parent item with its item ID. Similarly, the child item data object may reference a particular child item with its item ID.

The parent item data object may further reference the set of items for which the corresponding parent item is a parent with a child item set including item IDs of its child items. Similarly, the child item data object may further reference the set of items of which the corresponding child item is a child with a parent item set including item IDs of its parent items. The parent item data object may still further reference the set of categorize that categorize the corresponding parent item with a category set including the category IDs of those categories. The child item data object may still further reference a set of images associated with the corresponding child item with an image set including the image IDs of those images.

The image data object may reference a particular image with its image ID. The image data object may include reference to a set of items with which it is associated (e.g., is visually representative) with an item set including the item IDs of those items. The image data object may further include reference to a set of categories that categorizes the items referenced by the item set with a category set including the category IDs of those categories. Seemingly redundant references in the visually significant category data can facilitate effective and/or efficient searching category-aware visual similarity searches, for example, by speeding navigation of the data structure. The structure of the visually significant category data corresponds to a particular trade-off between search performance (e.g., in terms of request-response latency) and "in memory" storage (i.e., storage in a limited high speed memory resource). However, alternative structures and/or trade-offs are possible. For example, additional de-normalized data objects may be added to the visually significant category data that enhance search performance at a cost of an additional "in memory" storage requirement.

An example process can facilitate category-aware visual similarity searches in accordance with at least one embodiment. A category tree can be established and/or built. Any suitable automatic and/or manual technique may be utilized to create and/or define categories in the category tree, set and/or define some categories in the category tree as sub-categories of other categories in the category tree, and/or assign content in the collection of content to appropriate categories in the category tree. Such techniques are well known in the art, and need not be described here in detail. A visually significant subset of the category tree can be identified. For example, a visually significant category data maintenance module may identify the visually significant subset of the category tree at least in part by establishing and/or updating the visually significant category data as described elsewhere herein.

A request may be received that specifies query content, and a query candidate category set can be identified with respect to the search request from among the visually significant subset. For example, the search request may be associated with one or more sub-trees of the category tree based at least in part on a search context of the search request such as prior navigation and/or browsing of the category tree. The visually significant category module may identify the query candidate category set at least in part by determining an intersection of the query-associated sub-tree(s) and the visually significant subset. The query candidate category set can also be optimized. For example, the visually significant category module may remove categories from the query candidate category set that have child categories in the candidate category set as described below.

The optimized query candidate category set may be searched for categorized content that is visually similar to the query content. Results of the search may be provided for presentation. For example, the search module may provide the search results for presentation with the search user interface. At least part of the build time computational work may include establishing and/or maintaining the visually significant category data. FIG. 19 and A set of high level categories of the category tree may be identified. For example, the set of high level categories may include each category in a relatively high level of the category tree (e.g., corresponding to level 904 of the category tree 900 of FIG. 9). Alternatively, or in addition, the set of high level categories may be specified in a configuration file (e.g., with XML).

A next (e.g., a first) of the set of high level categories may be selected. A lower set size threshold may be identified for the selected category. For example, the visually significant category data maintenance module may determine the lower set size threshold based at least in part on (e.g., as a linear function of) a total number of items categorized by the selected category. Alternatively, or in addition, the lower set size threshold corresponding to the selected category may be specified in the configuration file. An upper size threshold may be identified for the selected category. For example, the visually significant category data maintenance module may determine the upper set size threshold based at least in part on (e.g., as a linear function of) a total number of items categorized by the selected category. Alternatively, or in addition, the upper set size threshold corresponding to the selected category may be specified in the configuration file. It may be determined whether there are more high level categories for which to identify set size thresholds. An ignored category set may also be identified. For example, the visually significant category data maintenance module may identify a subset of the category tree to be ignored for the purposes of visual similarity searches. The visually significant category data maintenance module may identify the ignored category set based at least in part on one or more attributes of categories in the category tree. For example, where the categories of the category tree categorize content in the collection of content corresponding to items of apparel such as shoes, the categories may have an attribute characterizing them as corresponding to a wearable dimension of the item of apparel (e.g., size) or a non-wearable dimension (e.g., color), and the visually significant category data maintenance module may identify the categories corresponding to wearable dimensions as part of the ignored category set. Alternatively, or in addition, categories in the category tree that are to be added to the ignored category set may be specified explicitly (e.g., with an "ignore for purposes of visual similarity" attribute) and/or in the configuration file.

A candidate set of visually significant categories may be established. For example, a visually significant category data maintenance module may add each category in a sub-tree of the category tree that is rooted at one or more of the categories in the high level category set identified to the candidate set of visually significant categories. A next (e.g., a first) category in the candidate set of visually significant categories may be selected. It may be determined whether the selected category is in the ignored category set. It may be determined whether the selected category is associated with a visual distinction. For example, the visually significant category data maintenance module may determine whether the selected category is associated with a visual distinction based at least in part on one or more attributes of the selected category (e.g., an "is visually distinctive" attribute). Alternatively, this step may be omitted so that each category in the candidate set of visually significant categories that is not also in the ignored category set is assumed to be associated with a visual distinction.

An image set associated with the selected category may be determined. For example, the visually significant category data maintenance module may determine a set of images associated with content in the collection of content corresponding to items that are categorized by the selected category. It may be determined whether a size of the image set (e.g., the number of images in the image set) is greater than the lower set size threshold. The visually significant category data may be updated with respect to the selected category. For example, the visually significant category data maintenance module may create a visually significant category data object corresponding to the selected category, as well as creating and/or updating parent item data objects, child item data objects, and/or image data objects referenced by the visually significant category data object corresponding to the selected category. The selected category may, at least in part, be thereby designated as visually significant. It may be determined whether there are further categories in the candidate set of visually significant categories to consider.

Figure 10:
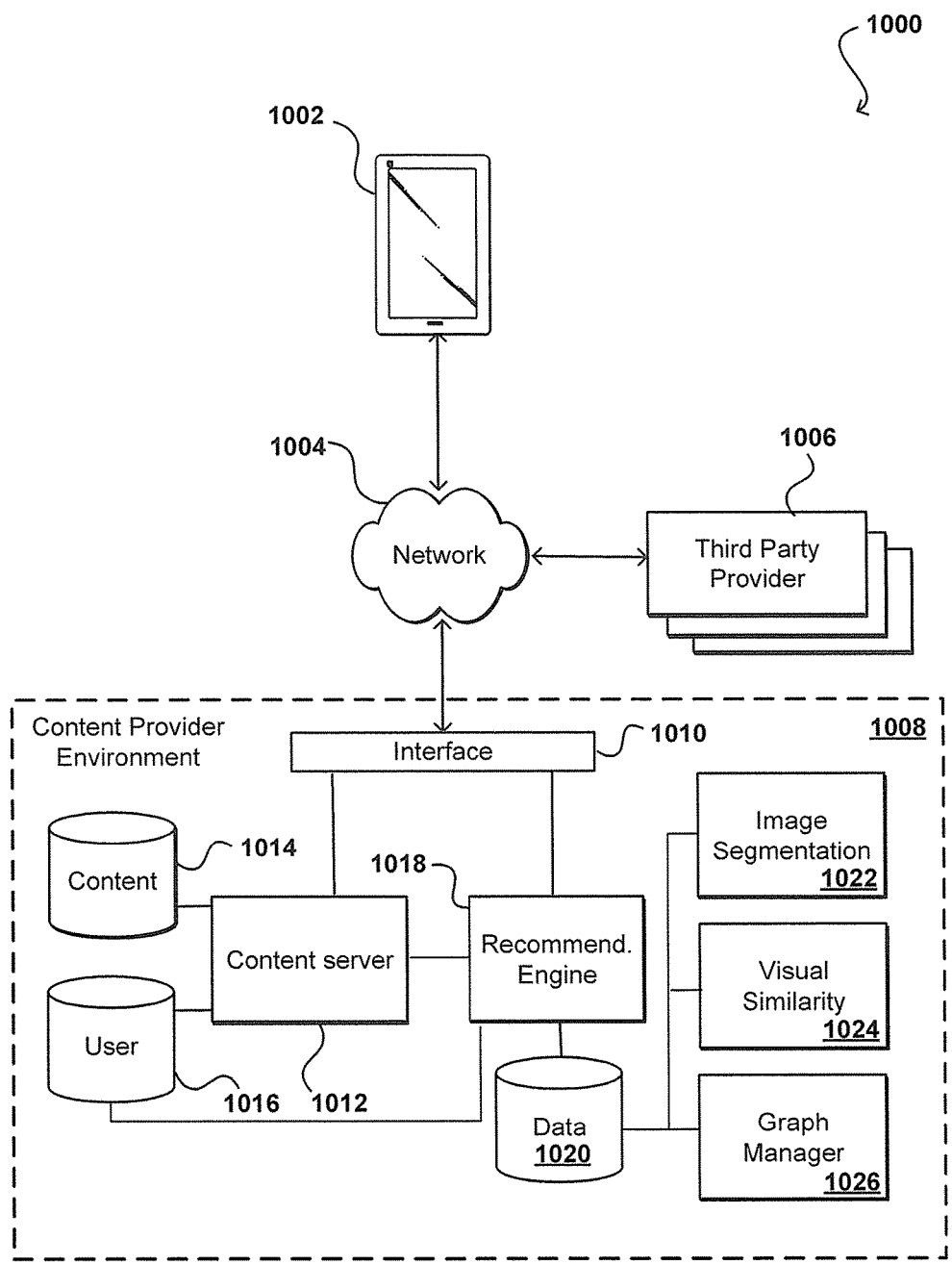
FIG. 10 illustrates an example environment in which aspects of the various embodiments can be implemented.

FIG. 10 illustrates an example environment 1000 in which various embodiments can be implemented. In this example, a user is able to use a client device 1002 to submit a request for content, such as a webpage or page of an electronic book, across at least one network 1004. Although a portable computing device (e.g., an electronic book reader, smart phone, or tablet computer) is shown as the client device, it should be understood that any electronic device capable of receiving, determining, and/or processing input can be used in accordance with various embodiments discussed herein, where the devices can include, for example, desktop computers, notebook computers, personal data assistants, video gaming consoles, television set top boxes, wearable computers (i.e., smart watches and glasses) and portable media players, among others. The at least one network 1004 can include any appropriate network, such as may include the Internet, an Intranet, a local area network (LAN), a cellular network, a Wi-Fi network, and the like. The request can be sent to an appropriate content provider environment 1008, which can provide one or more services, systems, or applications for processing such requests. The content provider can be any source of digital or electronic content, as may include a website provider, an online retailer, a video or audio content distributor, an e-book publisher, and the like.

In this example, the request is received to a network interface layer 1010 of the content provider environment 1008. The network interface layer can include any appropriate components known or used to receive requests from across a network, such as may include one or more application programming interfaces (APIs) or other such interfaces for receiving such requests. The network interface layer 1010 might be owned and operated by the provider, or leveraged by the provider as part of a shared resource or "cloud" offering. The network interface layer can receive and analyze the request from the client device 1002, and cause at least a portion of the information in the request to be directed to an appropriate system or service, such as a content server 1012 (e.g., a Web server or application server), among other such options. In the case of webpages, for example, at least one server 1012 might be used to generate code and send content for rendering the requested Web page. In cases where processing is to be performed, such as to generate search results, perform an operation on a user input, verify information for the request, etc., information might also be directed to at least other server for processing. The servers or other components of the environment might access one or more data stores, such as a user data store 1016 that contains information about the various users, and one or more content repositories 1014 storing content able to be served to those users.

As mentioned, in at least some embodiments the content to be provided can include data 1020 for one or more recommendations, advertisements, or other such elements that are selected based on information for the user associated with the request, for example by providing information to a recommendation engine 1018 or other such component or service, for analyzing the provided information and attempting to generate recommendations or other elements as discussed herein. In some embodiments, this can utilize content generated within the content provider environment 1008 or received from one or more third party providers 1006, among other such options. For example, a category of images can be generated using images captured within the environment or received from the third party providers 1006. As mentioned, an image segmentation system 1022 or other such component or service can analyze the images to attempt to determine portions of those images that correspond to individual items that have data stored in the content repository 1014 or elsewhere in the content provider environment 1008. This can include, for example, images of items available for consumption. The environment can also include a visual similarity system 1024, or other such component or service, for analyzing the image portions for the individual items and attempting to locate content for similar items that are at least somewhat visually similar. Again, this can include comparing the image portions, or data for those portions, against image data stored for items in the catalog. Based at least in part upon this information, a relation graph manager 1026, or other such system, service, or component, can attempt to build a relationship graph so that for any item in the catalog for which a query is received the graph can be consulted to determine a set of related items. The graph manager 1026 can also be responsible for managing the relation graph and updating the graph as new images or content is received.

Figure 11:
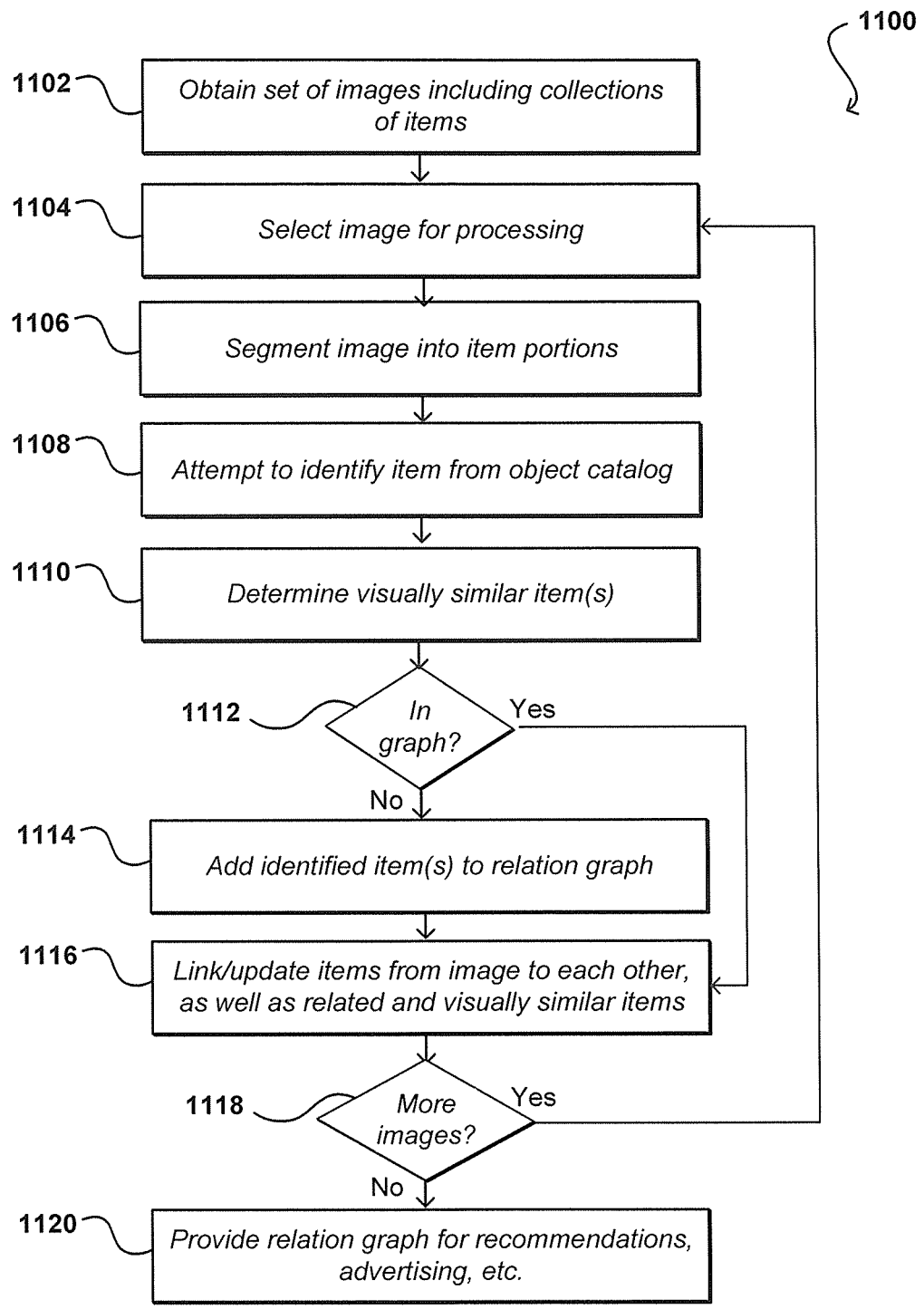
FIG. 11 illustrates an example process for generating a relation graph that can be utilized in accordance with various embodiments.

FIG. 11 illustrates an example process 1100 for generating a relation graph that can be utilized in accordance with various embodiments. It should be understood that there can be additional, fewer, or alternative steps performed in similar or alternative orders, or in parallel, within the scope of the various embodiments unless otherwise stated. In this example, a set of images is obtained 1102 that includes images with collections of items. The set can include subsets from different sources and/or received at different times. Further, the collections may include formal collections or other grouping of items contained in a single image, such as may be worn or used by a person represented in one of the images. The images may also include metadata regarding that which is represented in the images, such as may include item descriptions or identifiers, location information, collection data, person or model information, and the like. The images can be stored to a data store or in memory for subsequent analysis.

From the set of images, an image can be selected 1104 for processing. This can include any pre-processing, such as noise removal, color or intensity adjustment, and the like. The image can then be segmented 1106 into item portions using any of the processes discussed or suggested herein, such as by using connected contours or background removal to identify a potential item of interest, using an object recognition or image matching process on one or more portions of the image, etc. An object recognition or similar process can then attempt to identify 1108 each item region from an object catalog or other such repository or image library. As discussed, this can include an image matching process that can attempt to match the portion against a library of an image in an attempt to find a match with sufficient confidence or certainty that the item can be considered to be identified as the product represented in the matching image. The image of the item can also be analyzed to determine 1110 visually similar items from the electronic catalog (or another such source). As mentioned, this can include generating various histogram descriptors in some embodiments that can be compared against histogram descriptors for other items to attempt to identify items with similar visual aspects. Visually similar items to the items detected from the catalog can also be determined for analysis. It can be beneficial to locate these visually similar items as well to ensure that new items are included in the relation graph as appropriate. A determination can be made 1112 as to whether the item is already represented in a relation graph as having been identified from a previously received image, for example. If not, the identified items, including the recognized item from the image and the visually similar items, can be added 1114 to the relation graph as items that can be linked to other related items. Any new item for the relation graph, or item for which new information is available, can then have links created and/or updated 1116 in the relation graph. This can include adding links to related items for new items, and updating links for existing items to represent additional occurrences of items together, occurrences in certain locations or on certain types of users, etc. For an image with multiple items worn by the same person, this can include ensuring that all those items are linked to each other in the product graph, as well as potentially updating any existing links between those items as a result of the occurrence together. If there are more images 1118 the process can continue, otherwise the relation graph can be provided 1120 for use in making recommendations, selecting advertising, or performing other such tasks.

Figure 12:
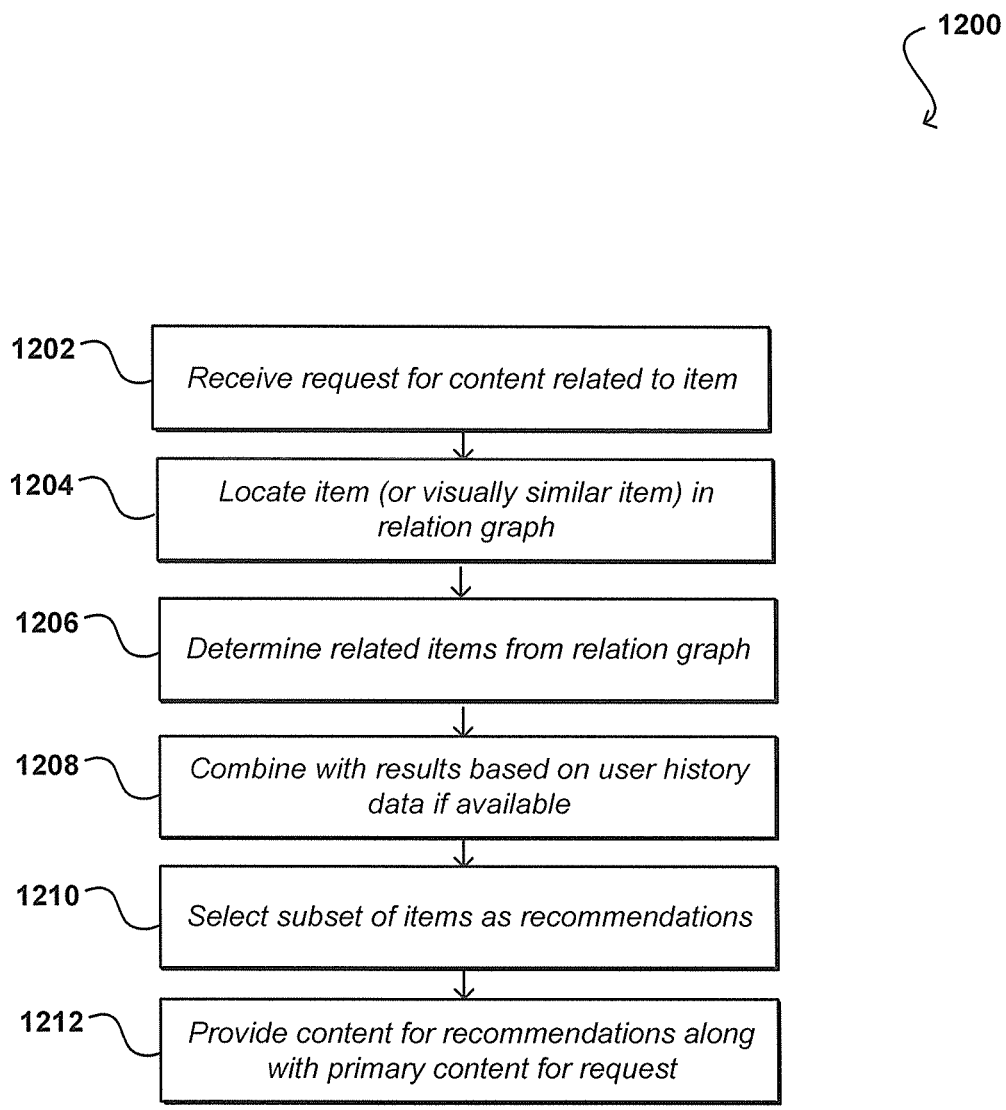
FIG. 12 illustrates an example process for utilizing a relation graph to make recommendations that can be utilized in accordance with various embodiments.

FIG. 12 illustrates an example process 1200 for generating recommendations using a relation graph such as that created in the process of FIG. 11. In this example, a request for content related to a particular item is received 1202. The request can be received in response to a search query for the item being received, a navigation to a page associated with the item, or another such action or occurrence. Information for the item of interest can be located 1204 in the relation graph. This can include, for example, determining a product identifier for the item of interest and locating an entry for that identifying in the relation graph. Related items from the relation graph can then be determined 1206. This can include examining the links from the item of interest in the graph to determine any, some, or all of the items that are linked, and thus at least somewhat related to, the item of interest. As mentioned, a link might exist solely because someone wore those items together, included them in a common display, or otherwise caused them to be displayed together in some type of grouping or collection. As mentioned, information for the user may be available in some situations. If so, additional results can be determined using any reasonable item recommendation process, such as those known or used in the art for making recommendations for display with an item or content based on information for that item or content as well as information available for the user, such as purchase or view history and the like. In some embodiments only items that appear together in images more frequently than may occur naturally or randomly, or are otherwise associated more strongly from the graph than random objects, can be considered for inclusion in a set of potential recommendations. The results from the relation graph can be combined 1208 with the results based on user history data or other such information to generate a pool of potentially related items.

At least a subset of those items can be selected 1210 as potential recommendations to provide to the user. The subset can be selected based upon a number of criteria, such as relatedness scores, occurrence scores, item type or category, item and/or request location, item availability, and other such criteria. For example, a user looking at clothing items in Hawaii might get different recommendations that a user looking at the same items in Iceland based upon different types of items being worn with that item in that location based on the received images. Content for at least some of the recommendations can then be provided 1212 with the primary content for the item of interest in order to cause one or more of the recommendations to be displayed to the user.

An advantage to such an approach is that recommendations will be selected and presented that can more likely be of interest to a user for whom sufficient information is not available to make personalized recommendations. This can help to reduce the amount of time the user needs to spend searching for items, and the number of pages or searches needed to be examined in order to find those items, which can reduce the amount of resources needed for that user session. Aspects of the present invention thus not only improve the user experience but also improve the performance of various computer systems as the amount of power, processing capacity, bandwidth, memory, and other resources needed for the session can be reduced, and the performance of the system for this and other users, as well as this and other tasks, improved.

Figure 13:
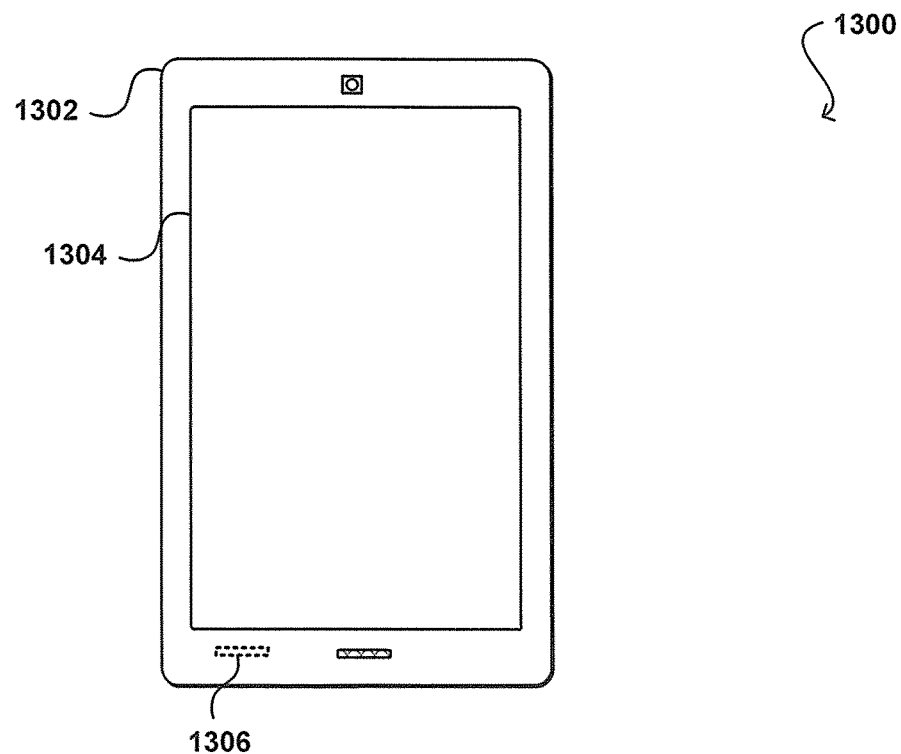
FIG. 13 illustrates an example device that can be used to implement aspects of the various embodiments.

FIG. 13 illustrates an example electronic user device 1300 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 1302 has a display screen 1304 on the front side, which under normal operation will display information to a user facing the display screen (e.g., on the same side of the computing device as the display screen). It should be understood that computing devices such as servers, however, may not have dedicated display elements. The example computing device 1300 also includes at least one networking component 1306, such as a network interface card, wireless networking component, and the like, enabling the computing device to communicate information over at least one network.

Figure 14:
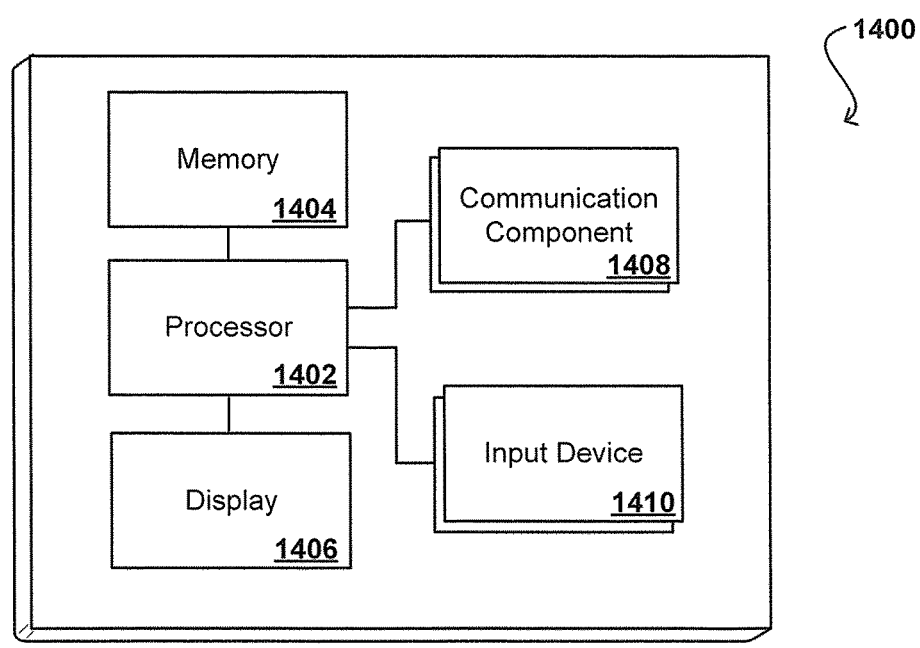
FIG. 14 illustrates example components of a client device such as that illustrated in FIG. 13.

FIG. 14 illustrates a logical arrangement of a set of general components of an example computing device 1400 such as the device 1300 described with respect to FIG. 13. In this example, the device includes a processor 1402 for executing instructions that can be stored in a memory device or element 1404. As would be apparent to one of ordinary skill in the art, the device can include many types of memory, data storage, or non-transitory computer-readable storage media, such as a first data storage for program instructions for execution by the processor 1402, a separate storage for images or data, a removable memory for sharing information with other devices, etc. The device typically will include some type of display element 1406, such as a touch screen or liquid crystal display (LCD), although devices such as portable media players might convey information via other means, such as through audio speakers. In some embodiments, the computing device 1400 of FIG. 14 can include one or more networking and/or communication elements 1408, such as a Wi-Fi, Bluetooth, RF, wired, or wireless communication system. The device in many embodiments can communicate with a network, such as the Internet, and may be able to communicate with other such devices. In some embodiments the device can include at least one additional input component 1410 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate non-transitory media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   obtaining, via one or more computing systems, a plurality of images, at least a subset of the plurality of images each including representations of multiple items;
   segmenting, via the one or more computing systems, each image of the subset into one or more item portions;
   comparing, via the one or more computing systems, the item portions against an electronic catalog to identify items represented in the item portions;
   determining, via the one or more computing systems, based at least in part upon image data from the item portions, visually similar items for the identified items;
   generating, via the one or more computing systems, a relation graph including a plurality of items and links between those items, the plurality of items including the identified items and the visually similar items, the links connecting items having been recognized together in one or more images of the subset;
   associating, via the one or more computing systems and for each link of the relation graph, a relation score, the relation score for a link being based at least in part upon a number of times the items corresponding to the link were recognized together in an image of the plurality of images;
   receiving, via the one or more computing systems, a request for content relating to an item of interest;
   determining, via the one or more computing systems, from the relation graph, a set of related items linked to the item of interest;
   generating, via the one or more computing systems, with primary content for the item of interest, supplemental content for at least a subset of the set of related items linked to the item of interest; and
   causing, via the one or more computing systems, the primary content for the item of interest and the supplemental content for the at least subset of the set of related items linked to the item of interest to be displayed on a computing device.

2. The computer-implemented method of claim 1, further comprising:
   selecting the subset of the set of related items based at least in part upon the relation scores for the corresponding links between the set of related items and the item of interest.

3. The computer-implemented method of claim 1, further comprising:
   identifying a person represented in an image, of the plurality of images, including the item of interest; and
   determining the relation score for an item represented in the image and the item of interest based at least in part upon an identity of the person.

4. The computer-implemented method of claim 1, further comprising:
   determining a geographic location associated with the request for content; and
   selecting the subset of the set of related items based at least in part upon the geographic location, the relation graph including metadata indicating one or more geographic locations for which items were recognized together in one or more images of the plurality of images.

5. A computer-implemented method, comprising:
obtaining, via at least one processor of a computing device, a plurality of images each including a representation of one or more items;
recognizing, via the at least one computer processor, items represented together in one or more images of the plurality of images;
generating, via the at least one processor, a relation graph including information for the items, the relation graph including links between the items represented together in one or more images of the plurality of images;
generating, via the at least one processor, a relation score for each of the links;
associating, via at least one processor, for each link of the relation graph, the relation score for a link being based at least in part upon a number of times the items corresponding to the link were recognized together in the one or more of the plurality of images;
determining related content associated with an item of interest based at least in part on the relation graph, the related content corresponding to one or more or the items linked to the item of interest in the relation graph; and
displaying, on the computing device, a primary content for the item of interest and a supplemental content for at least a subset of a set of related items linked to the item of interest.

6. The computer-implemented method of claim 5, further comprising:
segmenting each of the images into at least one item portion; and
comparing the at least one item portion against an electronic catalog in order to attempt to recognize an item in each of the item portions.

7. The computer-implemented method of claim 6, further comprising:
analyzing each of the images using a connected components analysis in order to identify the at least one item portion.

8. The computer-implemented method of claim 5, further comprising:
determining a foreground portion and a background portion of each image; and
analyzing the foreground portion of each image with an object recognition algorithm to attempt to recognize at least one item in each of the images.

9. The computer-implemented method of claim 5, further comprising:
determining one or more visually similar items for at least a subset of the one or more items; and
including information for the visually similar items in the relation graph, the visually similar items for a specified item each being linked to other items linked to the specified item.

10. The computer-implemented method of claim 9, further comprising:
generating a set of histogram descriptors for an item of the one or more items; and
comparing the set of histogram descriptors against histogram descriptors stored in an electronic catalog in order to identify the visually similar items.

11. The computer-implemented method of claim 5, further comprising:
receiving an additional plurality of images;
recognizing, via the at least one processor, items represented together in one or more images of the additional plurality of images; and
updating relation scores in the relation graph for items represented together in the one or more images of the additional plurality of images.

12. The computer-implemented method of claim 11, further comprising:
assigning a decay value to the relation scores, whereby a specified relation score of the relation scores decreases over time unless a subsequent occurrence of the items together in an image is determined.

13. The computer-implemented method of claim 5, wherein the relation score for a link between two items is based at least in part upon at least one of a co-location score, a calculated visual similarity, or a number of times the two items were represented together in the one or more images.

14. The computer-implemented method of claim 5, further comprising:
recognizing the items represented together in the one or more images of the plurality of images based further upon metadata included with at least a subset of the one or more images, at least a portion of the metadata identifying at least a subset of the items represented in the image.

15. A system, comprising:
at least one processor; and
memory including instructions that, when executed by the at least one processor, cause the system to:
receive a request for content relating to an item of interest, the content including a plurality of images each including representations of multiple items;
generating a relation graph based at least in part on the plurality of images, the relation graph including information for the items;
determine, using the relation graph, a set of items linked to the item of interest, links between pairs of items of the relation graph indicating that the pairs of items were recognized together in at least one image of the plurality of images, each link having a link score representative of at least a number of times a respective pair of items were recognized together;
select, from the set of items and based at least in part upon respective relation scores, a subset of the set of items;
provide, with primary content for the item of interest, related content for the subset of the set of items; and
displaying, on a display of the system, the primary content along with the related content for the subset of the set of items.

16. The system of claim 15, wherein the instructions when executed further cause the system to:
determine a geographic location associated with the request; and
select the subset of the set of items based at least in part upon geographic data associated with the items of the subset, the geographic data indicating one or more geographic locations where the items were recognized in an image with the item of interest.

17. The system of claim 15, wherein the related content includes at least one of recommendation content or advertising.

18. The system of claim 15, wherein each respective relation score for a link between a pair of items is determined based at least in part upon an identity of a person recognized in an image in which the pair of items is represented together.

19. The system of claim 15, wherein each respective relation score for a link between a pair of items is determined based at least in part upon a type of source of an image in which the pair of items is represented together.

* * * * *